United States Patent [19]

Murakami et al.

[11] Patent Number: 5,134,388

[45] Date of Patent: Jul. 28, 1992

[54] ELECTRONIC BLACKBOARD SYSTEM MARKER AND ERASER THEREFOR

[75] Inventors: Azuma Murakami; Tsuguya Yamanami; Toshiaki Senda; Yoshiaki Tomofuji; Satoshi Inashima; Hiroshi Mizuno, all of Saitama, Japan

[73] Assignee: Wacom Co., Ltd., Saitama, Japan

[21] Appl. No.: 690,317

[22] Filed: Apr. 25, 1991

Related U.S. Application Data

[63] Continuation of Ser. No. 604,540, Oct. 29, 1990, abandoned, which is a continuation of Ser. No. 244,273, Sep. 14, 1988, abandoned.

[30] Foreign Application Priority Data

Sep. 14, 1987 [JP] Japan .................................. 62-230683
Nov. 12, 1987 [JP] Japan .................................. 62-284377

[51] Int. Cl.⁵ .......................................... G09G 5/08
[52] U.S. Cl. .................................. 340/706; 178/19
[58] Field of Search ................ 340/706, 707, 709; 178/18, 19

[56] References Cited

U.S. PATENT DOCUMENTS

| | | |
|---|---|---|
| 2,812,427 | 11/1957 | Magondeaux . |
| 2,899,546 | 8/1959 | Hollmann . |
| 2,937,917 | 5/1960 | Anthony . |
| 2,958,781 | 11/1960 | Marchal et al. . |
| 3,117,277 | 1/1964 | Magondeaux . |
| 3,299,424 | 1/1967 | Vinding . |
| 3,373,425 | 3/1968 | Barishchoff et al. . |
| 3,376,551 | 4/1968 | Armbruster . |
| 3,461,400 | 8/1969 | Koda . |
| 4,240,065 | 12/1980 | Howbrook . |
| 4,270,044 | 5/1981 | Fencl . |
| 4,520,357 | 5/1985 | Castleberry et al. . |
| 4,532,376 | 7/1985 | Rockwell . |
| 4,542,261 | 9/1985 | Behnke . |
| 4,580,007 | 4/1986 | Searby et al. . |
| 4,670,751 | 6/1987 | Erokido et al. ............... 178/18 |
| 4,688,933 | 8/1987 | Lapeyre ............................ 340/707 |
| 4,711,977 | 12/1987 | Miyamori et al. ................ 178/18 |
| 4,786,765 | 11/1988 | Yamanami et al. ............... 178/19 |
| 4,808,980 | 2/1989 | Drumm ........................... 340/707 |
| 4,902,858 | 2/1990 | Yamanami et al. ............... 178/19 |

Primary Examiner—Jeffery A. Brier
Attorney, Agent, or Firm—Lowe, Price, LeBlanc & Becker

[57] ABSTRACT

A determination is made as to which one of plural objects is proximate a region having a coil therein. Each object includes a tuned circuit having a different resonant frequency. AC energy at the different resonant frequencies is supplied to the coil. The tuned circuit on the particular object in the region having substantially the same resonant frequency as the AC energy supplied to the coil causes a change in the current flowing in the coil at the same resonant frequency. The change in the current flowing in the coil at the same resonant frequency is sensed. In response to the current change at the same resonant frequency the particular object having the tuned circuit with the same resonant frequency as the frequency of the applied AC energy is indicated with a phase detector arrangement responsive to the changed current flowing in the coil at the same resonant frequency and a reference wave at the same resonant frequency. The phase detector arrangement derives indications of the polarities of the phase of quadrature components of the changed current relative to the reference wave and indicates the durations of the polarities relative to predetermined values therefor.

38 Claims, 14 Drawing Sheets

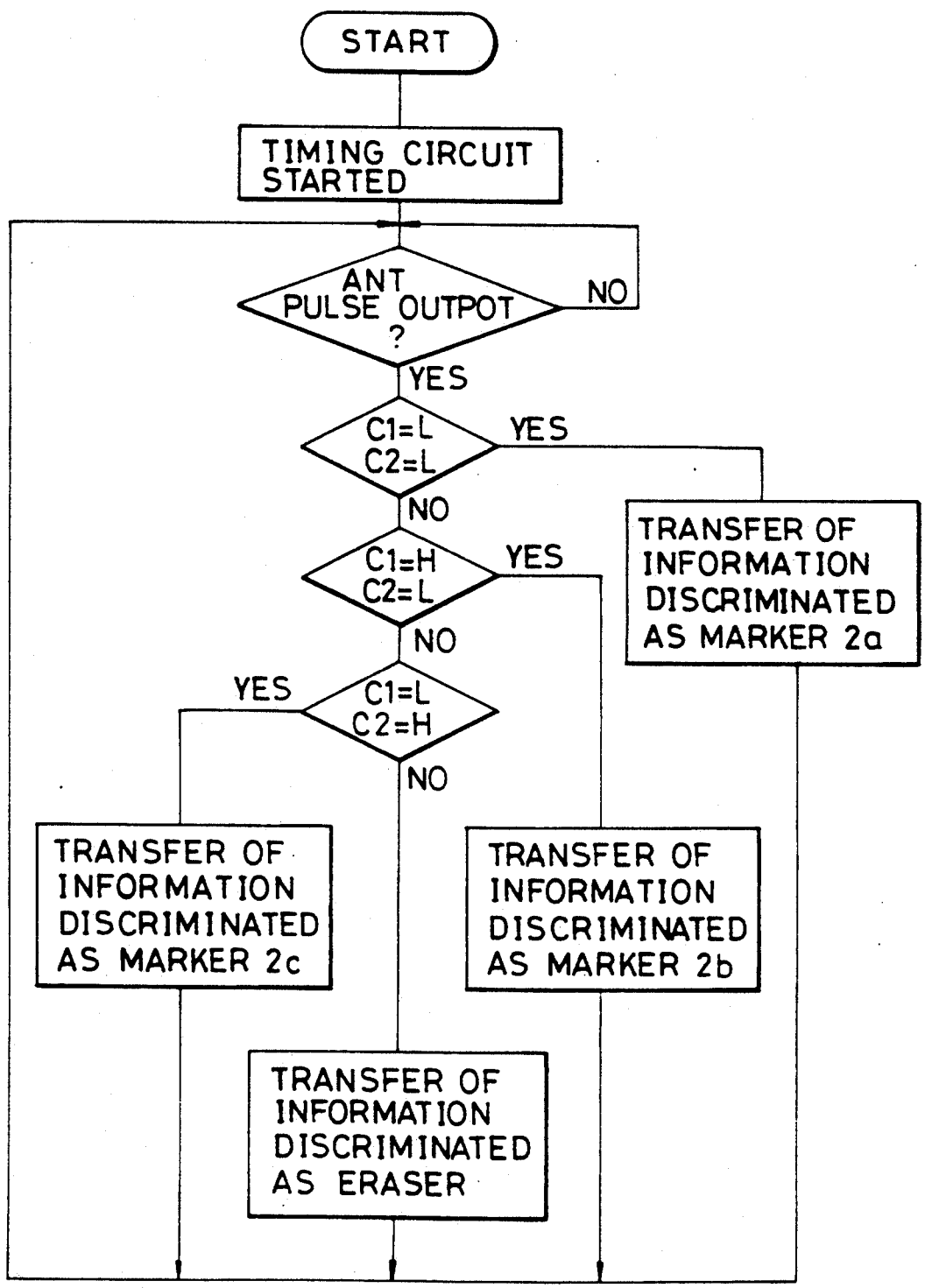

ELECTRONIC BLACKBOARD SYSTEM MARKER AND ERASER THEREFOR

This application is a continuation of Ser. No. 604,540, filed Oct. 29, 1990, now abandoned, which is a continuation of application Ser. No. 07/244,273filed Sept. 14, 1988 now abandoned.

BACKGROUND OF THE INVENTION

1. Field of the Invention

The present invention relates to an electronic blackboard system which is capable of processing as electric signals various types of information such as written information, erased information and designated information on a writing surface using a writing instrument, an eraser, and a designating rod and of outputting necessary information to an output unit.

2. Description of the Prior Art

As a conventional apparatus of this type, the present applicant already proposed one disclosed in Japanese Patent Application No. 2736/1986 "Electronic Blackboard Apparatus" (refer to Japanese Patent Laid-Open No. 160299/1987). A brief description thereof will be given.

A blackboard body comprises a tablet and a casing which is made of a non-magnetic material and whose surface is formed as a writing surface which can be used repeatedly. The tablet is arranged such that a multiplicity of position detecting members each mainly composed of an elongated magnetostrictive transmission medium element made of an amorphous alloy or the like, a first coil wound around one end thereof, and a second coil wound around the substantially entire length thereof are arranged in parallel in the X- and Y-directions.

If a pulse current is applied to the first coil, fluctuations in the magnetic field occur around the first coil due to the action of electromagnetic conversion, with the result that magnetostrictive vibratory waves are produced in the magnetostrictive transmission medium element. The magnetostrictive waves propagate through the magnetostrictive transmission medium element at a peculiar speed, and, in the mean time, fluctuations in the magnetic field corresponding to an electrical/mechanical coupling coefficient at each position.

To depict an image, if a magnetism generator for producing a steady magnetic bias, such as a marker or an eraser each having a magnet, is operated, the magnetic bias is applied to the magnetostrictive medium element, and the electrical mechanical coupling coefficient at that position is increased. For this reason, when the magnetostrictive vibratory waves reach the position immediately below the marker or the eraser, large fluctuations occur in the magnetic field, and a large induced voltage occurs in the second coil.

The time required from application of a pulse current to the first coil until the generation of a large induced voltage in the second coil is the time required as the magnetostrictive vibratory waves propagate from the position at which the first coil is wound around the magnetostrictive medium element to the position immediately below the marker or the eraser, and is proportional to the distance therebetween. Hence, if this time is measured, the coordinates of the marker or the eraser are detected.

If a comparison is made between the function of the marker and that of an eraser, the marker forms an image on the writing surface, while the eraser erases an image on the writing surface. Since their functions are utterly different, in order to obtain an image data corresponding to an image used for the marker and that for the eraser, it is necessary to accurately discriminate the coordinates for the marker and those for the eraser.

In the above-described apparatus, infrared-ray signals respectively having different frequencies are transmitted from the marker and the eraser when they are used, and these signals are received by the blackboard body. Thus, discrimination is made on the basis of the frequency as to whether the marker is being used or the eraser is being used.

With the above-described arrangement, however, it is necessary to provide the marker and the eraser with infrared ray-emitting elements, oscillation modulation circuits, switches, and batteries for operating them. Hence, there has been drawbacks in that the arrangement becomes complicated, large is size and weight, and that replacement or charging of the batteries must be carried out frequently, thereby aggravating the operating efficiency of the marker and the eraser.

In addition, the coordinates obtained as described above are normally stored in a predetermined image memory as image data corresponding to the image formed on the writing surface by the writing instrument. However, the image data is output from a printer as a hard copy, as necessary, or displaced on a display device connected to the apparatus, or transmitted to another similar electronic blackboard apparatus installed in a remote place via a communication line so as to be displayed on a display device thereof.

When a lecture is given by using an electronic board, there are cases where it is desirable to proceed with the lecture by indicating a desired position on the image on the writing surface with a finger or a rod-shaped instrument.

However, in the case of the above-described electronic board apparatus, there has been a drawback in that a person who is looking at the writing surface of the blackboard body can recognize the indicated position, but the indicated position cannot be known to the person who is viewing the display device.

SUMMARY OF THE INVENTION

To this end, a primary object of the present invention is to provide a new and improved blackboard system having a marker and an eraser which do not require a cord, a battery or the like and excels in the operating efficiency.

To this end, the present invention provides, in accordance with one aspect of the invention, the combination of a coil, plural objects adapted to be selectively in proximity to the coil, and means for supplying AC energy at different frequencies to the coil. Each of the objects includes a tuned circuit having a different resonant frequency. The tuned circuit on the particular object in proximity to the coil has substantially the same resonant frequency as the AC energy supplied to the coil to cause a change in the current flowing in the coil at said same frequency. The change in the current flowing in the coil at the same resonant frequency is sensed. In response to the current change at the same resonant frequency the particular object having the tuned circuit with the same resonant frequency as the frequency of the applied AC energy is indicated with a phase detector-means. The phase detector means responds to the changed current flowing in the coil at the same resonant frequency and a reference wave at the same resonant frequency for: (a) deriving indications of the polarities of the phase of quadrature components of the changed current relative to the reference wave, and (b) indicating the durations of the polarity indications relative to predetermined values therefor.

The invention is also directed to apparatus for determining which one of plural objects is in proximity to a region, wherein each of the objects includes a tuned circuit having a different resonant frequency. The apparatus comprises a coil in the region, means for supplying AC energy at different resonant frequencies in the coil, and means for sensing the change in the current flowing in the coil at the same resonant frequency and responding to the current change at the same resonant frequency and responding to the current change at the same resonant frequency to indicate the particular object having the tuned circuit with the same resonant frequency as the frequency of the applied AC energy. The tuned circuit on the particular object in the region has substantially the same resonant frequency as the AC energy supplied to the coil causing a change in the current flowing in the coil at said same frequency. The sensing means includes phase detector means responsive to the changed current flowing in the coil at said same frequency and a reference wave at the same resonant frequency for; (a) deriving indications of the polarities of the phase of quadrature components of the changed current relative to the reference wave, and (b) indicating the durations of the polarities responsive to predetermined values therefor.

In a preferred embodiment, the phase detector means includes: (a) first and second phase detectors for deriving d.c. signals having polarities indicative of said indications of the polarities, (b) separate pulse width detectors responsive to said first and second polarities for deriving binary levels indicative of the polarities subsisting for in excess of a predetermined duration, and (c) gate means responsive to said pulse width detectors.

Each of the separate pulse width detectors preferably includes first and second comparators for deriving first and second bi-level signals having durations equal to the intervals while the d.c. signals respectively have the first and second polarities. The separate pulse width detectors include first and second pulse width detectors respectively responsive to the first and second bi-level signals derived by the first and second comparators.

The other objects, features and advantages of the present invention will become apparent from the following detailed description of the invention when read in conjunction with the accompanying drawings.

BRIEF DESCRIPTION OF THE DRAWINGS

FIG. 17 is a flowchart of processing by a control circuit of the writing instrument discriminating circuit.

DESCRIPTION OF THE PREFERRED EMBODIMENTS

Figure 1:
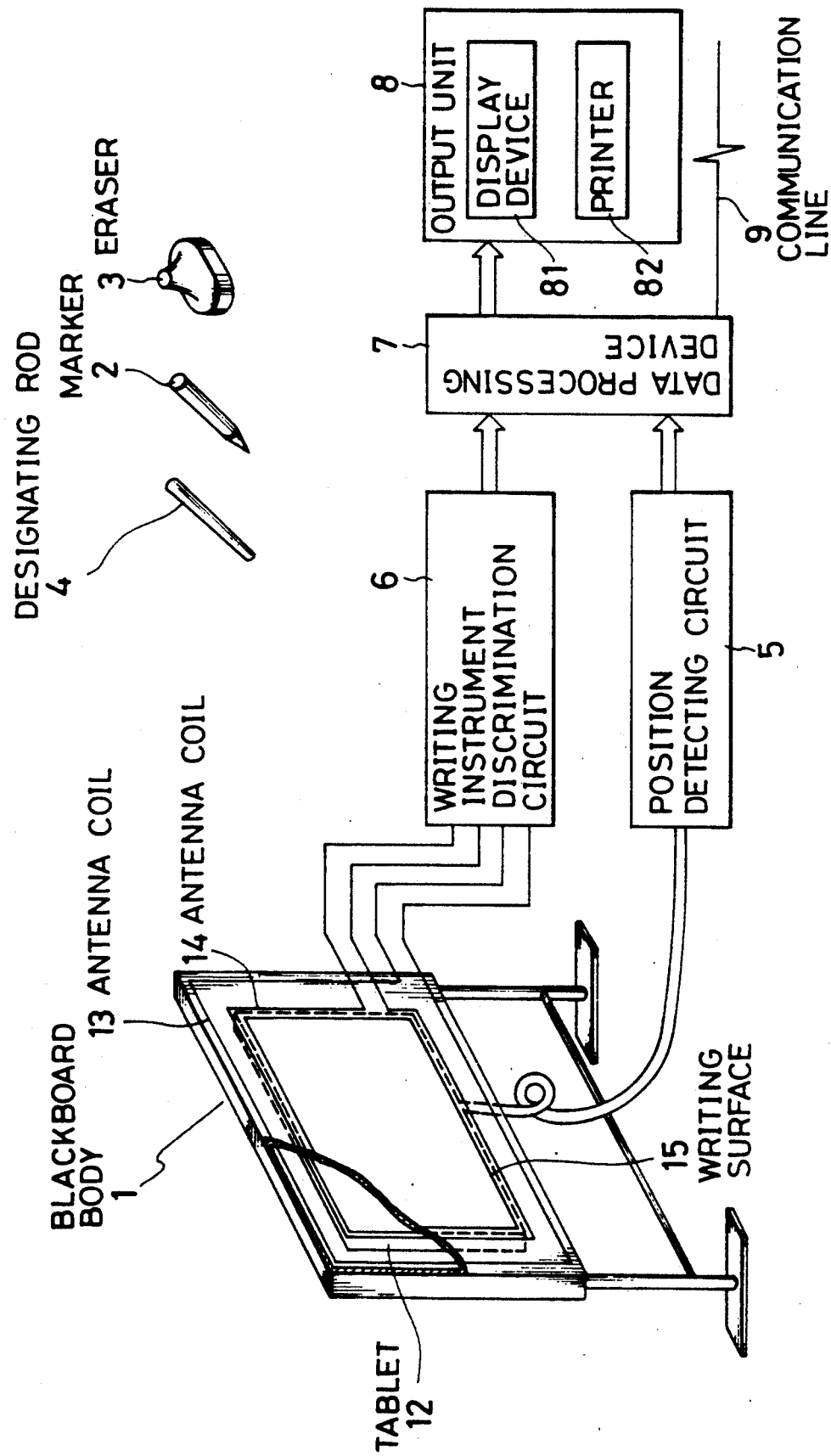
FIG. 1 is diagram illustrating a first embodiment of an electronic blackboard system in accordance with the present invention.

FIG. 1 illustrates a first embodiment of an electronic blackboard system in accordance with the present invention. The electronic blackboard system comprises the following major components: a blackboard body 1, a marker 2, an eraser 3, a designating rod 4, a position detecting circuit 5, a writing instrument discriminating circuit 6, a data processing device 7, an output unit 8, and a communication line 9.

The blackboard body 1 is arranged such that a casing 11 made of a non-magnetic metal is provided with an antenna coil 13 for transmission (hereafter referred to as the transmission coil), and an antenna coil 14 for reception (hereafter referred to as the reception coil). The tablet 12 is connected to the position detecting circuit 5, while the transmission coil 13 and the reception coil 14 are connected to the writing instrument discriminating circuit 6.

Figure 2:
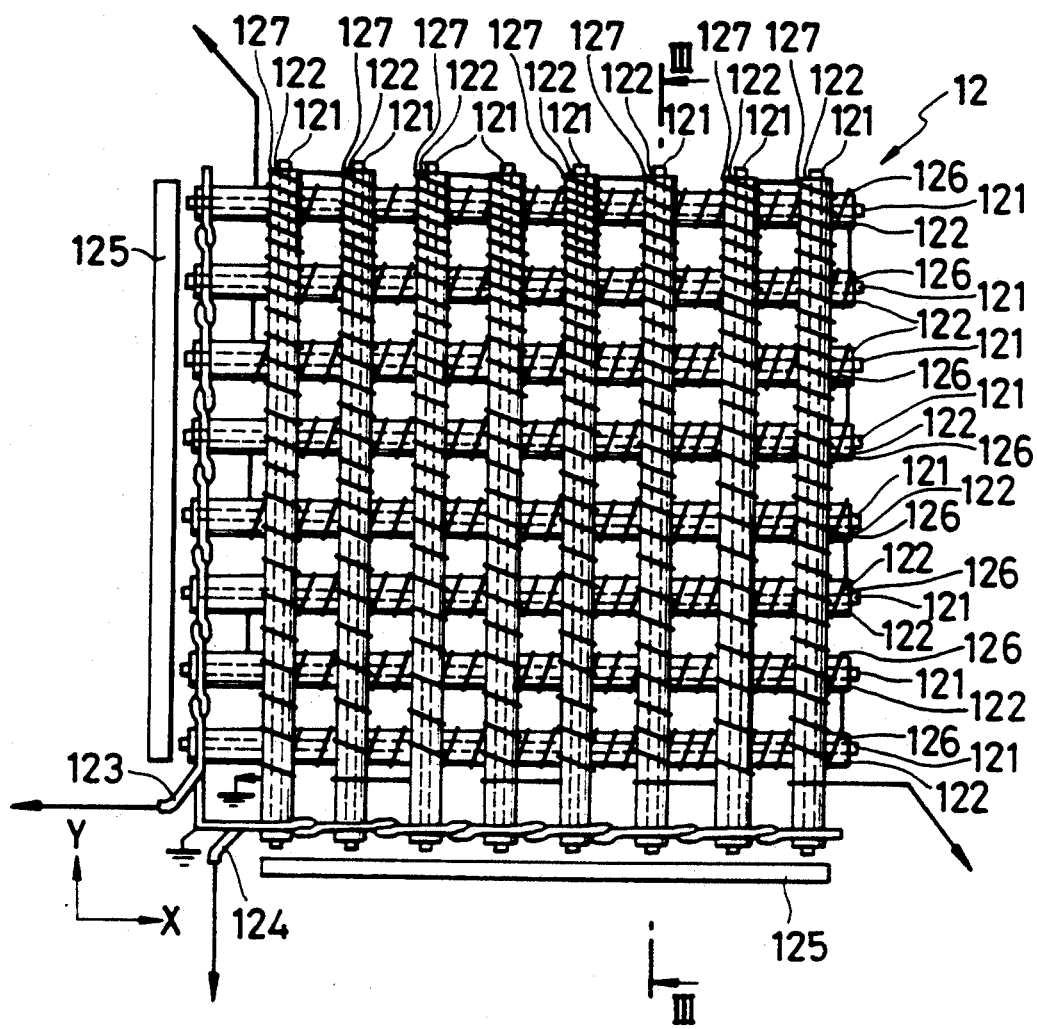
FIG. 2 is a top plan view illustrating a structure of a tablet.
Figure 3:
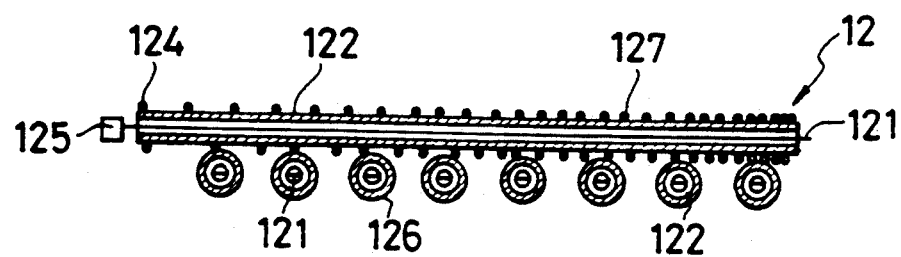
FIG. 3 is a cross-sectional view taken along the line III—III of FIG. 2.

FIG. 2 is a top plan view illustrating a structure of the tablet 12, while FIG. 3 is a cross-sectional view taken along the line III—III in the direction of the arrows in FIG. 2. In the drawings, a plurality of magnetostrictive transmission medium elements 121 are disposed in the X- and Y-directions substantially in parallel with each other, respectively. Any material can be used as the magnetostrictive transmission medium elements 121, but a material having a large magnetostrictive effect, i.e., an amorphous alloy containing a large amount of iron, is particularly preferable so as to produce strong magnetostrictive vibratory waves. In addition, a material having such a small retaining force that it is difficult to be magnetized even if a magnet is brought adjacent thereto. As for the amorphous alloy, for instance, it is possible to use $Fe_{67}CO_{18}B_{14}Si_1$ (atomic %), $Fe_{81}B_{13.5}Si_{3.5}C_2$ (atomic %) and the like. Each of the magnetostrictive transmission medium elements 121 has an elongated configuration, its cross section being preferably shaped into the form of a thin rectangular strip or a circular rod. In the case of the thin rectangular strip, the width of several millimeters or thereabouts and the thickness of several microns to several dozens of microns or thereabouts facilitate produce and yield excellent characteristics. Since an amorphous alloy can be fabricated into a small thickness of 20 to 50 microns, this may be cut into the form of a thin strip or a rod. In this embodiment, magnetostrictive transmission medium elements each made of $Fe_{81}B_{13.5}Si_{3.5}C_2$ (automic %) and having the width of 2 mm and the thickness of 0.02 mm are used.

Elongated tubular reinforcements 122 are made of a synthetic resin or the like and accommodate therein the magnetostrictive transmission medium elements 121, respectively.

An X-direction first coil 123 is disposed on end portions of the reinforcements 122 for the magnetostrictive transmission medium elements 121 arranged in the X-direction. This X-direction first coil 123 is twisted between the adjacent reinforcements 122 and is wound around each of the adjacent magnetostrictive transmission medium elements 121 in an alternately opposite direction. The arrangement is such that the direction of a magnetic flux produced in portions corresponding to the respective magnetostrictive transmission medium elements 121 when a current is allowed to flow through the coil 123 or the direction of a voltage produced in the aforementioned portions when a magnetic flux is applied to the coil 123 in one direction becomes opposite to that of an adjacent one. For this reason, the pulse noises and induced voltages from the outside which are generated when a pulse current is allowed to flow through the coil 123 offset each other between the adjacent portions of the coil 123 and thus become weak. Incidentally, although one turn is provided in the illustrated example in terms of the number of turns, two or more turns may be provided. This X-direction first coil 123 is designed to produce instantaneous fluctuations in the magnetic field and to produce magnetostrictive vibratory waves in the wound portions of the magnetostrictive transmission medium elements 121, one end of the coil 123 being connected to the position detecting circuit 5 and the other being grounded.

A-direction first coil is disposed on end portions of the reinforcements 122 for the magnetostrictive transmission medium elements 121 arranged in the Y-direction. This Y-direction first coil 124 is twisted between the adjacent reinforcements 122 and is wound around each of the adjacent magnetostrictive transmission medium elements 121 in an alternately opposite direction. One end of this Y-direction first coil 124 is connected to the position detecting circuit 5 and the other end is grounded in the same way as the coil 123. The operation of this Y-direction first coil is the same as that of the coil 123.

Figure 4:
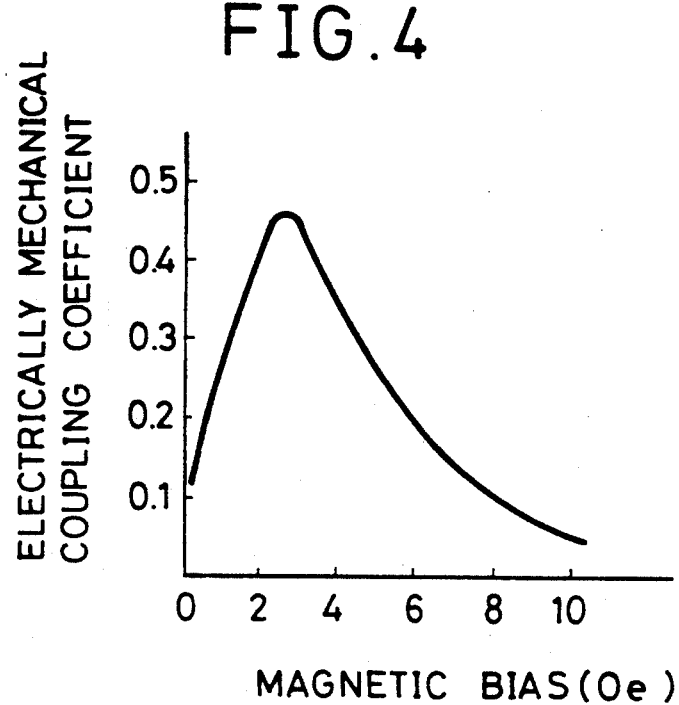
FIG. 4 is characteristic diagram of a magnetic bias vis-à-vis an electrical/mechanical coupling coefficient.

A pair of biasing magnetism generators 125, e.g., square magnets, are respectively designed to apply a bias magnetic field to the wound portion of the X-direction first coil 123 and the wound portion of the Y-direction first coil 124 in a direction parallel to the longitudinal direction thereof. The reason for thus applying a bias magnetic field is to enable production of large magnetostrictive vibratory waves with a small current and to designate the positin of occurrence of the magnetostrictive vibratory waves. In other words, since the electrical mechanical coupling coefficient (a coefficient indicating the efficiency of conversion from mechanical energy to electricl energy or vice versa) of the magnetostrictive transmission medium element 121 becomes maximum at the time of a bias magnetic field such as the one shown in FIG. 4, the magnetostrictive vibratory waves can be produced with a high degree of efficiency by applying such a magnetic bias to the wound portions of the X-direction first coil 123 and the Y-direction first coil 124.

Y-direction second coils 126 are disposed on the reinforcements 122 over a wide range of the magnetostrictive transmission medium elements 121 that are arranged in the X-direction. The coils 126 are wound around all of these magnetostrictive transmission medium elements 121 in the same direction (counterclockwise in this embodiment) and are connected in series in such a manner that the polarity of connection becomes opposite between the adjacent coils. Accordingly, the direction of a voltage and a current produced in each of the coils 126 when a unidirectional magnetic flux is applied to all the coils 126 or the direction of a magnetic flux produced in each of the coils 126 when a current is allowed to flow through all the coils 126 becomes opposite between the adjacent coils. Hence, the voltage induced from the outside and noises offset each other between the adjacent coils and consequently become weak.

As for the winding pitch of the coils 126, the coils 126 are wound such as to become gradually denser toward the side of the other opposite ends than the side of ends adjacent to the X-direction first coil 123, thereby compensating for the induced voltage from becoming small due to the attenuation of the magnetostrictive vibratory waves. Generally, in order to increase an induced electromotive force, the winding pitch should preferably be large. These X-direction second coils are designed to detect an induced voltage resulting from magnetostrictive vibratory waves propagating through the magnetostrictive transmission medium elements 121, one end thereof being connected to the position detecting circuit 5 and the other end being grounded. The wound area serves as a position detecting area.

In addition, Y-direction second coils 127 are disposed on the reinforcements over a wide range of the magnetostrictive transmission medium elements that are arranged in the Y-direction. The coils 127 are wound around all of these magnetostrictive transmission medium elements 121 in the same direction (counterclockwise in this embodiment) and are connected in series in such a manner that the polarity of connection becomes opposite between the adjacent coils. In addition, as for the winding pitch of the coils 127, the coils 127 are wound such as to become gradually denser toward the side of the other opposite ends than the side of ends adjacent to the Y-direction first coil 124, one end thereof being connected to the position detecting circuit 5 and the other being grounded in the same way as the coils 126. Incidentally, the operation of the coils 127 is similar to that of the coils 126.

The X-direction position detecting section comprising the magnetostrictive transmission medium elements 121 in the X-direction, the reinforcements 122 thereof, the X-direction first coil 123, and the X-direction second coils 126 on the one hand, and the Y-direction position detecting section comprising the Y-direction magnetostrictive transmission medium elements 121, the reinforcements 122 thereof, the Y-directions first coil 124, and the Y-direction second coils 127 on the other are superposed on each other such as to be perpendicular to each other and are accommodated substantially in the center of the casing 11. In addition, the biasing square magnets 125 are accommodated in and fixed to the casing 11 in such a manner as to oppose the end portions of the magnetostrictive transmission medium elements 121, but may be arranged in parallel such as to be disposed above, below, or laterally of the magnetostrictive transmission medium elements 121.

A portion of the casing 11 corresponding to the tablet 12 is formed of aluminum- or austenite-based stainless steel or the like whose surface is enamel finished, and is arranged to constitute the writing surface 15 which can be used repeatedly.

The transmission coil 13 and the reception coil 14 are repectively arranged such that conductors provided with insulation coating are arranged on the surface of the casing 11 around the writing surface 15, i.e., the coordinates inputting range. Incidentally, although both of the transmission coil 13 and the reception coil 14 are shown as being one-turn coils in the drawings, but actually have several turns.

Figure 5:
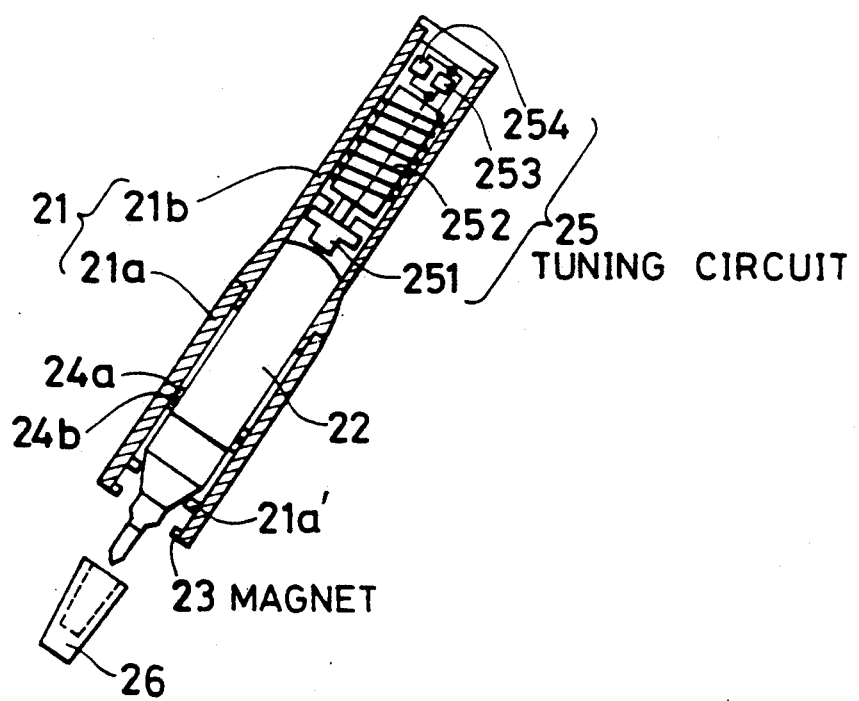
FIG. 5 is a cross-sectional view of a marker.

FIG. 5 shows a detailed structure of the marker 2. This marker 2 comprises: a pen shaft 21 constituted by two portions 21a and 21b which are formed of a non-metallic material such as a synthetic resin and are coupled with each other by being screwed in; a pen body 22 such as a commercially available black felt pen; and annular magnet 23 for designating a position; annular magnets 24a, 24b; a tuning circuit 25 having a switch 251, a coil 252 with a core, a capacitor 253, and a variable capacitor 254; and a cap 26 for the pen body 22.

The pen body 22 is accommodated in such a manner as to be slightly slidable between a stopper 21a' provided in the portion 21a inside the pen shaft 21 and the switch 251 accommodated in the portion 21b. In addition, the magnets 24a, 24b are designed to extend the magnetic flux of the magnet 23 in the axial direction of the pen body 22 and is arranged such that the same position as that of the tip of the pen body 22 can be designated even in a state in which the marker 2 is slightly inclined.

Figure 10:
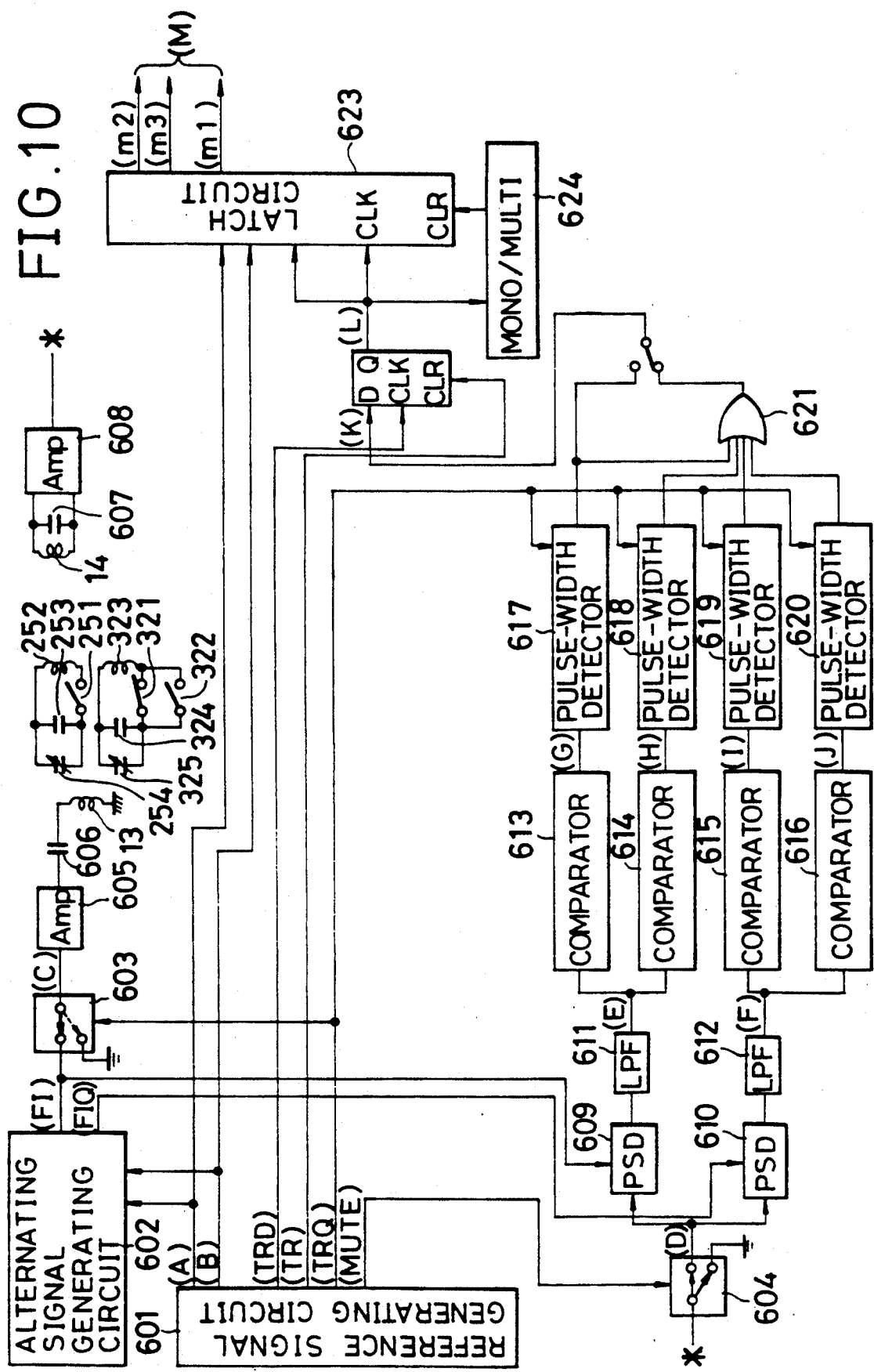
FIG. 10 is a schematic diagram illustrating tuning circuits of the marker and the eraser as well as details of a writing instrument discriminating circuit.

As also shown in FIG. 10, the tuning circuit 25 is arranged such that one end of the coil 252 is connected to ends of the capacitor 253 and the variable capacitor 254 via the switch 251, while the other end of the coil 252 is connected to the other ends of the capacitor 253 and the variable capacitor 254. When the tip of the pen body 22 is contacting nothing, the switch 251 is in a non-operative state, and the one end of the coil 252 is not connected to the one end of the variable capacitor 254. Meanwhile, if the pen shaft 21 is held with fingers or the like and the tip of the pen body 22 is pressed against the writing surface 15 or the like so as to be pressed into the pen shaft 21, the switch 251 is pressed by a rear end thereof and assumes an operative state, and the one end of the coil 252 is connected to the ends of the capacitor 253 and the variable capacitor 254. Numerical values of the coil 252, the capacitor 253, and the variable capacitor 254 are set to those values that constitute a known resonance circuit which resonates at a predetermined frequency f1, e.g., 280 kHz.

It is assumed that there are two other types of marker (not shown) that are similar to the above-described marker 2, excluding the fact that, in the case of one marker, the color of the ink of the pen body 22 is red and the resonant frequency of the turning circuit 25 is a predetermined frequency f2, e.g., 290 kHz, while, in the case of the other marker, the color of the ink of the pen body 22 is green and the resonant frequency of the tuning circuit 25 is a predetermined frequency f3, e.g., 300 kHz.

Figure 6:
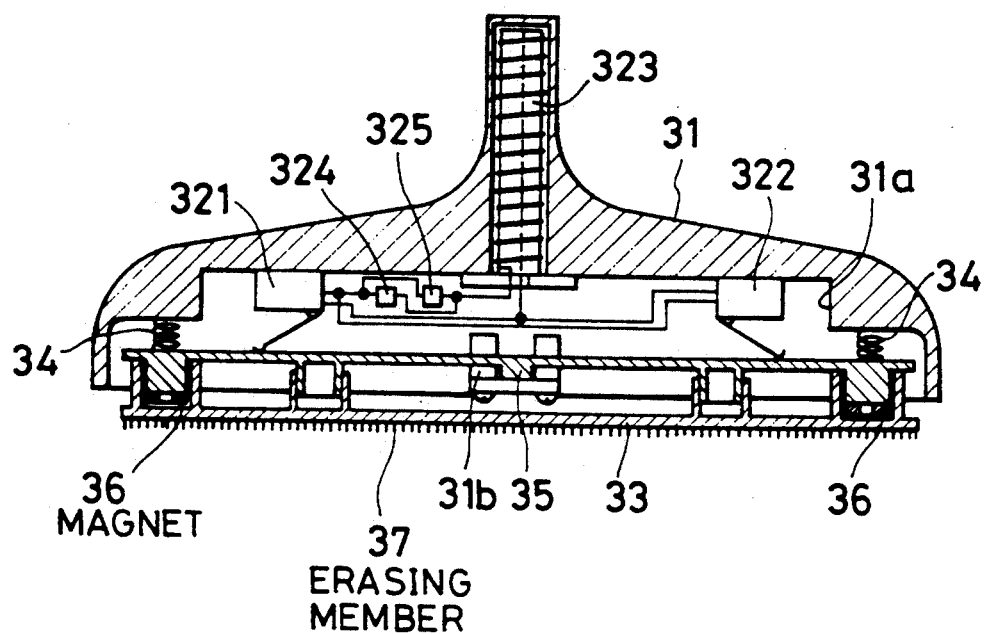
FIG. 6 is a cross-sectional view of an eraser.

FIG. 6 illustrates a detailed structure of the eraser 3. The eraser 3 comprises: a case 31 made of a non-metallic material such as a synthetic resin; a tuning circuit 32 having switches 321, 322, a coil 323 with a core, a capacitor 324, and a variable capacitor 325 that are accommodated in the interior 31a of the case 31; a movable plate 33 having a configuration corresponding to a bottom surface of the case 31; springs 34 inserted between the movable plate 33 and the case 31; a stopper 35 for engaging with an engaging portion 31b of the interior 31a and adapted to restrict the position of the movable plate 33 with respect to the case 31; a pair of annular magnets 36 for designating a position respectively provided at opposite ends of the movable plate 33; and an erasing member 37, such as felt, provided on an outer surface of the movable plate 33. The movable plate 33 is held so as to move slightly with respect to the case 31 in such a manner that either one of the switches 321 and 322 can be moved or both of them can be moved simultaneously.

As is also shown in FIG. 10, the tuning circuit 32 is arranged as follows: One end of the coil 323 is connected to ends of the capacitor 324 and the variable capacitor 325 via the switches 321 and 322, while the other end of the coil 323 is connected to the other ends of the capacitor 324 and the variable capacitor 325. When the erasing member 37 is contacting nothing, the switches 321 and 322 are in a non-operative state, and the one end of the coil 323 is not connected to the ends of the capacitor 324 and the variable capacitor 324. Meanwhile, if the case 31 is held with fingers or the like and the erasing member 37 is pressed against the writing surface 15 or the like so as to press the movable plate 33 into the case 31, either one of the switches 321 and 322 or both of them are pressed by the movable plate 33 and assume an operative state, with the result that the one end of the coil 323 is connected to the other ends of the capacitor 324 and the variable capacitor 325. Incidentally, numerical values of the coil 323, the capacitor 324, and the variable capacitor 325 are set to those values that constitute a known resonance circuit which resonates at a known frequency f4, e.g., 310 kHz.

Figure 7:
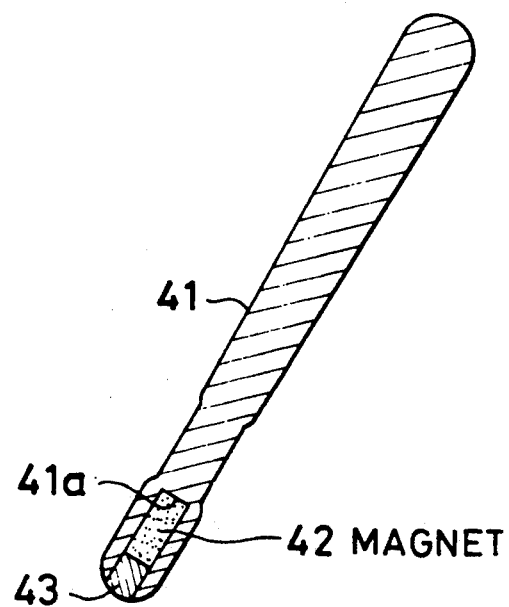
FIG. 7 is a cross-sectional view of a designating rod.

FIG. 7 shows a detailed structure of the designating rod 4. The designating rod 4 is made of a synthetic resin, wood, metal or the like and comprises a body 41 having at a tip portion thereof a recess 41a for accommodating a magnet, a position designating magnet 42 embedded in the recess 41a, and a cap 43 for covering the recess 41a. Incidentally, the body 41 may be formed such as to be capable of expansion and contraction.

Figure 8:
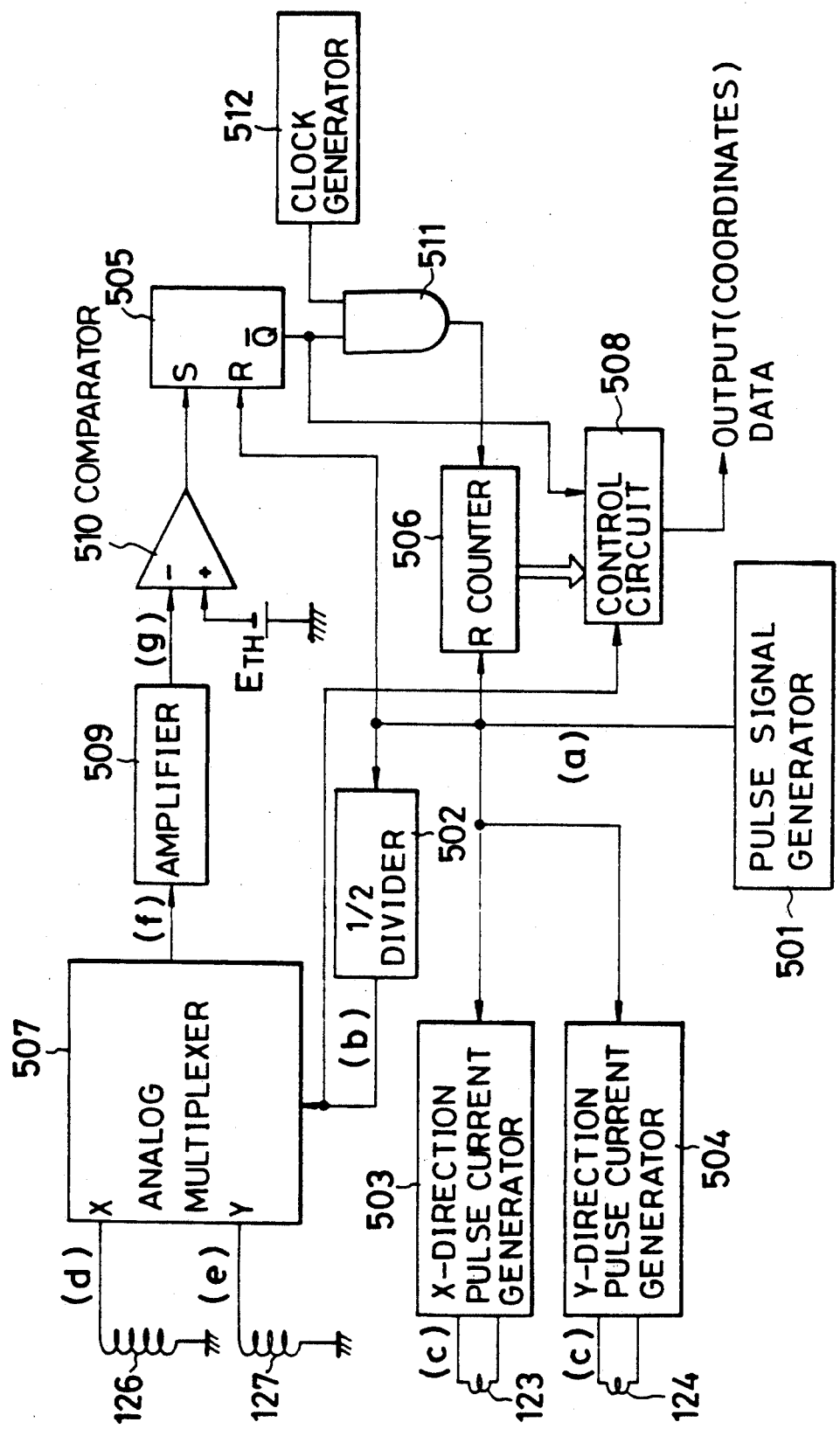
FIG. 8 is a schematic diagram illustrating details of a position detecting circuit.

FIG. 8 shows a detailed configuration of the position detecting circuit 5. The position detecting circuit 5 comprises the following maim components: a pulse signal generator 501, a ½ divider 502, an X-direction pulse current generator 503; a Y-direction pulse current generator 504; a flip-flop 505; a counter 506; an analog multiplexer 507; a control circuit 508; an amplifier 509; a comparator 510; an AND circuit 511; and a clock generator 512.

Figure 9:
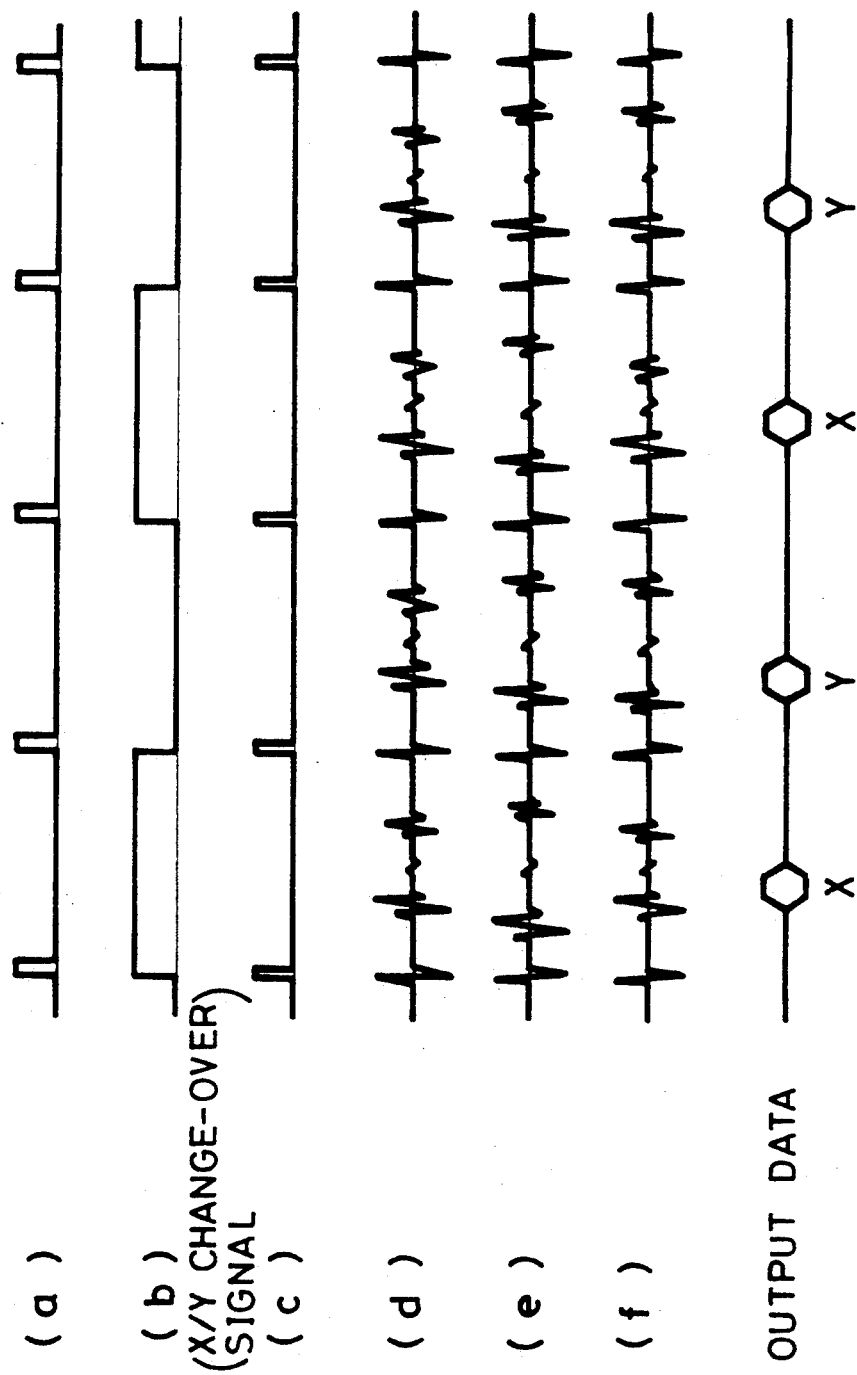
FIG. 9 is a signal waveform diagram of various parts shown in FIG. 8.

FIG. 9 shows the waveforms of signals in the respective components shown in FIG. 8, and the operation will be described hereafter together with the arrangement of the respective components shown in FIG. 8.

When the power is turned on, the pulse signal generator 501 generates a pulse signal (a) having a period equivalent to a time during which magnetostrictive vibratory waves propagate from one end of the magnetostrictive transmission medium element 121, are reflected at the end thereof, and then return to the one end thereof. The pulse signal (a) is divided into halves by the ½ divider 502 so as to be converted into an X/Y changeover signal (a) and is supplied to the analog multiplexer 507 and the control circuit 508. At the same time, this signal is supplied as it is to the X-direction pulse current generator 503, the Y-direction pulse current generator 504, the flip-flop 505, and the counter 506.

The X/Y changeover signal (b) is designed to control the changeover for connection with the analog multiplexer 507 and supply information on the direction of position detection to the control circuit 508. When the level of this X/Y changeover signal (b) is high, an X-terminal and a Z-terminal are connected to each other, and the data thus obtained is used as the coordinate data in the X-direction. Meanwhile, when the level of the X/Y changeover signal (b) is low, a Y-terminal and a Z-terminal are connected to each other, and the data thus obtained is used as the coordinate data in the Y-direction.

The X-direction pulse current generator 503 and the Y-direction pulse current generator 504, upon receiving the pulse signal (a), applies a pulse current (c) to the X-direction first coil 123 and the Y-direction first coil 124, respectively, thereby causing magnetostrictive vibratory waves to be produced at ends of the magnetostrictive transmission medium elements 121 in the X- and Y-directions. In addition, the flip-flop 505 and the counter 506 are reset by the pulse signal (a), and the counter 506 starts counting the clock pulses of the clock generator 512 supplied thereto via the AND circuit 511.

The magnetostrictive vibratory waves produced at the ends of the magnetostrictive transmission medium elements 121 in the X- and Y- directions propagate toward the respective other ends at a predetermined speed (approx. 5,000 m/sec.). During this propagation, the magnetostrictive vibratory waves are converted from mechanical energy into electrical energy in accordance with the magnitude of the electrical mechanical coupling coefficient at various positions of the respective magnetostrictive transmission medium elements 121. Thus, induced voltages (d) and (e) are respectively produced in the X-direction second coils 126 and the Y-direction second coils 127. The induced voltages (d) and (e) are alternately output by the analog multiplexer 507 in response to the level of the X/Y changeover signal (b) and are thus converted into a signal (f), which is amplified by the amplifier 509 so as to be converted into a signal (g), which in turn is supplied to the comparator 510 where the signal is compared with a predetermined threshold voltage $E_{TH}$.

At this juncture, it is assumed that a writing instrument such as the marker 2 or the eraser 3 or the designating rod 4 is being used on the writing surface 15 of the blackboard body, and that the magnet 23, 36 or 42 is applying magnetism to the magnetostrictive transmission medium elements 121 in the X- and Y-directions to such an extent as to increase the electrical/mechanical coupling coefficient. Then, a voltage above the threshold voltage $E_{TH}$ is produced in the signal (g) in correspondence with the time when the magnetostrictive vibratory waves reach the portion of the magnetostrictive transmission medium element 121 in the X- or Y-direction where magnetism is being applied.

Upon detecting a voltage above the threshold voltage $E_{TH}$, the comparator 510 outputs a high-level signal to set the flip-flop 505. Subsequently, the AND circuit 511 is closed by an output $\overline{Q}$ of the flip-flop 505, and the counting by the counter 5069 is thereby stopped. The count of the counter 506 represents the time which has elapsed after the pulse signal (a) was output. Furthermore, this time corresponds to a distance from the portion of the magnetostrictive transmission medium element 121 in the X- or Y-direction where the first coil is wound to the portion thereof where the magnetism is applied, i.e., coordinate data.

Upon receiving the output $\overline{Q}$, the control circuit 508 reads and temporarily stores the count of the counter 506 and the level of the X/Y changeover signal (b). As described before, since the X/Y changover signal is changed over each time the pulse signal (a) is generated, the coordinate data in the X- and Y-directions are obtained alternately. These data are supplied consecutively to the data processing device 7 at predetermined timings.

In addition, at this time, in a case where a writing instrument such as the marker 2 or the eraser 3 or a designating rod 4 is not sufficiently close to the writing surface 15 and its magnet 23, 36, or 42 is not applying a sufficient magnetic bias to the magnetostrictive transmission medium elements 121 of the tablet 12, an induced voltage above the threshold voltage $E_{TH}$ is not produced in the signal (g). Accordingly, the coordinate data is not obtained by the control circuit 508 without the flip-flop 505 being set by the comparator 510.

Although, in the above-described embodiment, the X-direction first coil 123 and the Y-direction first coil 124 are used to generate magnetostrictive vibratory waves, and the X-direction second coils 126 and the Y-direction second coils 127 are used to detect the magnetostrictive vibratory waves, a reverse arrangement may be adopted. In that case, the magnetostrictive vibratory waves are produced immediately below the magnet 23, 36 or 42 of a writing instrument such as the marker 2 or the eraser 3 or the designating rod 4, and induced voltages are produced in the first coils 123, 124.

FIG. 10 shows a detailed configuration of the writing instrument discrimination circuit 6 which constitutes a circuit for discriminating a writing instrument being used, i.e., one of the marker 2 and the eraser 3, as well as the tuning circuit of the marker 2 and the eraser 3. As shown in FIG. 10, the writing instrument discrimination circuit 6 comprises the following main components: a reference signal generating circuit 601; an alternating signal generating circuit 602; transmission and reception changeover circuits 603, 604; a drive circuit 605; capacitors 606, 607; an amplifier 608; phase detectors (PSD) 609, 610; low-pass filters (LPF) 611, ,612; comparators 613, 614, 615, 616; pulse-width detectors 617, 618, 619, 620; an OR circuit 621; a flip-flop 622; a latch circuit 623; and a mono-multi circuit 624.

Incidentally, it is assumed that portions indicated by *, * in FIG. 10 are connected.

Figure 11:
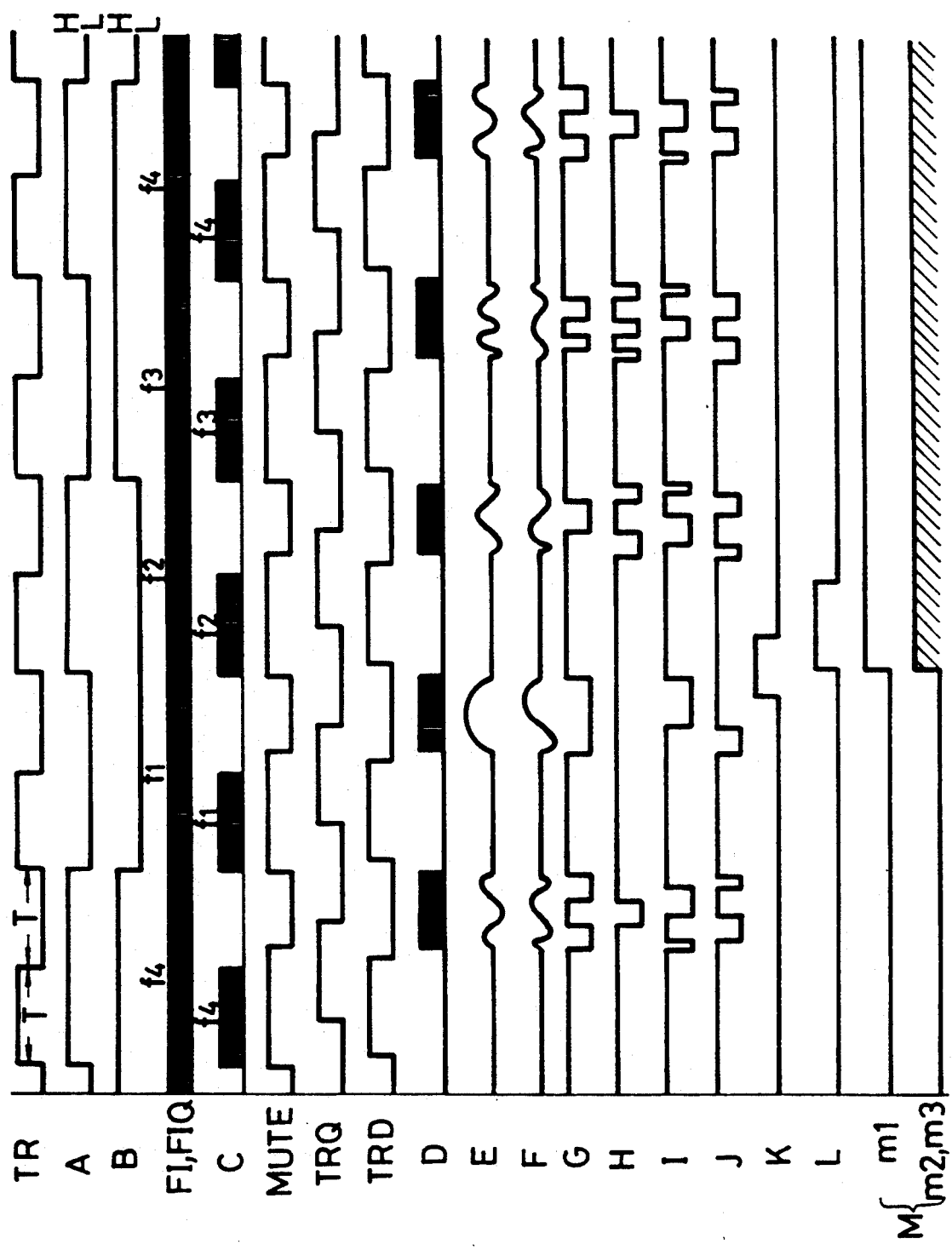
FIG. 11 is a signal waveform diagram of various parts shown in FIG. 10.

FIG. 11 illustrates signal waveforms in the respective components shown in FIG. 10, and a description will be given hereafter of the arrangement and operation of each of the components shown in FIG. 10.

The reference signal generating circuit 601 generates the following signals: a transmission/reception changeover signal TR of a predetermined frequency fk, e.g., 9,375 Hz; a changeover signal A in which the transmission/reception a changeover signal TR is divided into two equal parts; a changeover signal B in which the transmission/reception changeover signal TR is divided into four equal parts; a control signal TRQ in which the phase of the tansmission/reception changeover signal TR is delayed 90 degrees (¼ wavelength); a control signal TRD in which the phase of the transmission/reception changeover signal TR is delayed 22.5 degrees (1/16 wavelength); and a control signal MUTE in which the period of the high (H) level of the transmission/reception changeover signal TR is extended by a ¼ wavelength.

The transmission/reception changeover signal RT is supplied to the transmission/reception changeover circuit 603 and the flip-flop 622; the changeover signals A, B are supplied to the alternating signal generating circuit 602 and the latch circuit 623; the control signal TRQ is suplied to the pulse-width detectors 617-620; the control signal TRD is supplied to a clock terminal of the flip-flop 622; and the control signal MUTE is supplied to the transmission/reception changeover circuit 604.

The alternating signal generating circuit 602 has rectangular wave signal generators respectively producing rectangular wave signals of frequencies f1, f2, f3, f4. In addition, as the levels of the changeover signals A, B change consecutively and repeatedly in the order of "L (low level), L", "H, L", "L, H", and "H, H" for each predetermined time 2T (=1/fk), the alternating signal generating circuit 602 correspondingly generates a signal FI for consecutively repeating the rectangular wave signals of the frequencies f1, f2, f3, f4 as well as a signal FIQ for consecutively repeating a signal in which the phases of the rectangular wave signals of the frequencies f1, f2, f3, f4 are delayed 90 degrees (¼ wavelength), for each predetermined time 2T in a manner similar to that described above.

The aforementioned signal F1 is supplied to the phase detector 609, and is converted into a sinusoidal signal by a low-pass filter (not shown) and supplied to one input terminal of the transmission/reception changeover circuit 603. Meanwhile, the signal FIQ, having a phase displaced by 90° from the reference phase of signal FI, is supplied to the phase detector 610.

The other input terminal of the transmission/reception changeover circuit 603 is grounded. Since the one input terminal is selected when the transmission/reception changeover signal TR is of high level and the other imput terminal is selected when it is of low level, a transmission signal C, which causes sinusoidal signals of the frequencies f1-f4 to be issued consecutively only for the time duration T at intervals of time 2T or causes the same not to be issued, is output by the transmission/reception changeover circuit 603.

The signal C is supplied to a drive circuit 605 and further to the transmission coil 13 via the capacitor 606. However, since the capacitor 606 and the transmission coil 13 constitute a serial resonance circuit having resonance frequencies centering on the frequencies f1-f4, the serial resonance circuit resonates, and radiowaves of the frequencies f1-f4 are consecutively transmitted by the transmission coil 13 for the time duration T at intervals of time 2T.

At this juncture, if a writing instrument, such as the marker 2, is used on the writing surface 15 of the blackboard body 1, and if the writing instrument is held in such a manner that an angle formed between the pen shaft 21 and the writing surface is kept within 90°-45° or thereabouts with the tip of the pen body 22 contacting the writing surface 15 and with the switch 251 kept in an operative state, the component of the frequency f1 among the aforementioned radiowaves excites the coil 252 of the marker 2, which in turn causes an induced voltage synchronized with the component of the frequency f1 of the signal C to be produced in the tuning circuit 25 thereof (actually, however, the coil 252 is excited by the components of the other frequencies f2-f4 among the radiowaves, but since the frequencies are slightly different, their amplitude is small).

Subsequently, when the signal C is not generated, i.e., during the period of reception, the transmission coil 13 is grounded, so that the alternating signal in the above-described serial resonance circuit is speedily set to 0, and its radiowaves disappear immediately. However, the aforementioned induced voltage gradually attenuates in accordance with the loss in the tuning circuit 25.

On the other hand, the current flowing through the tuning circuit 25 on the basis of the induced voltage causes the coil 252 to transmit radiowaves of the frequency f1. These radiowaves excite the transmission coil 14, causes a parallel resonance circuit, comprising the reception coil 14 and the capacitor 607 connected parallel thereto and having resonance frequencies cantering on the frequencies f1-f4, to resonate, and causes the parallel resonance circuit to produce an induced voltage of the frequency f1 (actually, however, the reception coil 14 is excited by radiowaves transmitted by the transmission coil 13, but since the reception coil 14 is grounded during this period, as will be described later, no induced voltage is generated). The induced voltage is transmitted to and amplified by the amplifier 608 and, and is further transmitted to the transmission/reception changeover circuit 604.

The transmission/reception changeover circuit 604 is arranged such as to change over the output of the amplifier 608 to the phase detectors 609, 610 or to ground on the basis of the control signal MUTE. When the control signal MUTE is of low level, the output of the amplifier 608 is connected to the phase detectors 609, 610, while, when the signal is of high level, the output is connected to ground. Accordingly, a signal D, which is provided with the induced voltage of the frequency f1 based on the frequency component f1 of the signal C as well as an induced voltage of the frequency f1 based on the frequency components f2-f4 of the signal C, is obtained in the output of the transmission/reception changeover circuit 604.

Although the signal D is transmitted to the phase detectors 609, 610, since the above-described signal F1 has already been supplied to the phase detector 609 as a detection signal. Hence, among the induced voltages contained in the signal D, both the frequencies and phases of portions corresponding to the component of the frequency f1 in the signal FI agree with each other. However, the frequencies of the portions corresponding to the components of the other frequencies f2-f4 do not agree with each other. In addition, the aforementioned signal FIQ has already been supplied to the phase detector 610 as a detection signal, and, among the induced voltages contained in the signal D, with respect to portions corresponding to the component of the frequency f1 in the signal FIQ, the frequencies agree with each other, but the phases do not, while the frequencies do not coincide with respect to portions corresponding to the components of the other frequencies f2-f4.

Accordingly, the phase detector 609 outputs a signal which has only a positive-side signal component with respect to that portion of the induced voltages contained in the signal D that corresponds to the component of the frequency F1 in the signal FI, and which has a signal components on the positive and negative sides with respect to portion corresponding to the components of the other frequencies f1-f4. Meanwhile, the phase detector 610 outputs a signal which has a signal component on the positive and negative sides with respect to those portions of the induced voltages (contained in the signal D) that correspond to the components of the frequencies f1–f4 in the signal FI.

The output signal of the phase detector 609 is supplied to the low-pass filter 611 having a sufficiently low cut-off frequency and is converted into a signal E which, with respect to a portion corresponding to the component of the frequency f1 in the signal FI, has a positve DC voltage provided with a predetermined time span and a voltage, and, with respect to portions corresponding to the components of the other frequencies f2–f4, has an AC voltage corresponding to a difference in the frequency between the frequencies f2–4 and the frequency f1, and is supplied to the comparators 613, 614. In addition, the output signal of the phase detector 610 is supplied to the low-pass filter similarly having a sufficiently low cut-off frequency, where the signal is converted into a signal F having an AC voltage corresponding to a difference in the frequency or phase between the frequencies f1–f4 and the frequency f1 with respect to portions corresponding to the components of the frequencies f1–f4 in the signal FI and is then supplied to the comparators 615, 616.

Using 0.5 V or thereabouts as a threshold voltage, the comparators 613, 615 output a low-level voltage when the voltage of the input signal is the threshold voltage or above and a high-level voltage when it is below the threshold voltage. Meanwhile, using −0.5 V or thereabouts as a threshold voltage, the comparators 614, 616 output a low-level voltage when the voltage of the input signal is low and high-level voltage when it is the threshold voltage or above.

Accordingly, the signals G, H, I, J are respectively obtained in the outputs of the comparator 613–616, and are respectively supplied to the pulse-width detectors 617–620.

The pulse-width detectors 617–620 output detection pulses when they detect pulses of a predetermined time span, e.g. T/2 of more, in their input signals. However, in the case of the above-described signals G–J, the pulse-width detector 617 detects a positive DC voltage corresponding to the component of the frequency f1 in the signal FI and generates a pulse. That signal K is supplied to the flip-flop 622 via the OR circuit 621.

The reason why two phase detectors and two low-pass filters are used, four comparators and four pulse-width detectors, and a sum of the outputs of the pulse-width detectors in adapted to be obtained by the OR circuit is to ensure that, even if the frequency of the tuning circuit slightly deviates due to a change with time or the like, the radiowaves reflected by the tuning circuit can be detected.

The flip-flop 622 generates a signal L from the signal K, control signals TRD and TR, and supply them to a data input terminal and a clock termianl of the latch circuit 623 and the mono/multi circuit 624.

The latch circuit 623 latches the signals input to the respective data terminals at the rising of the signal L, i.e., the changeover signals A, B and the signal L itself. The latched signal L is supplied to the data processing device 7 as a signal m1 which indicated with high level a state in which a writing instrument, i.e., the marker 2, is designating the coordinates to be input (this signal m1 is hereafter referred to as the "pen-down signal").

In addition, as described above, the levels of the changeover signals A, B indicate that the frequency of the transmission signal FI at that point of time is any of f1, f2, f3, f4, and the latched signals A, B are supplied to the data processing device 7 as 2-bit discrimination information m2, m3 (here "L, L") which indicate the tuning frequency of the tuning circuit of the writing instrument being used is any of f1–f4, i.e., whether the writing instrument being used is the marker 2 or the eraser 3. Incidentally, the pen-down signal m1 and the writing instrument discrimination information m2, m3 will be collectively called a writing instrument discrimination signal M.

Upon receiving a rise of the signal L, the mono/multi circuit 624 generates a pulse signal of a time span which is slightly longer than a time 8T and speedily clears the latch circuit 623 when the signal L is not output in the next cycle, i.e., when the writing instrument being used (in this case, the switch 251 of the marker 2) is off (i.e., pen-up), thereby stoppin the supply of the writing instrument discrimination signal M.

In addition, when the eraser 3 is used on the writing surface 15 of the blackboard body 1, i.e., a part or all of the erase member 37 is pressed against the writing surface 15, and when either or both of the switches 321, 322 of the tuning circuit 32 thereof become operative, radiowaves corresponding to the frequency f4 are reflected from the tuning circuit 32. Therefore, the writing instrument discrimination circuit 6 discriminates this in the same manner as described above, and supplies the pen-down signal m1 and the writing instrument discrimination information m2, m3 (here "H, H") to the data processing device 7.

Furthermore, when the designating rod 4 is being used on the writing surface 15 of the blackboard body 1, or the marker 2 or the eraser 3 is not contacting the writing surface 15, i.e., when the switch 251, 321, or 322 is used in the off state, no radiowaves are reflected. Accordingly, the writing instrument discrimination circuit 6 outputs the low-level pen-down signal m1 which means that there is no writing instrument.

On the other hand, as described above, the position detecting circuit 5 detects a position from the time when a magnetic bias caused by the magnet 23 of the marker 2, the magnet 36 of the eraser 3, or the magnet 42 of the designating rod 4 has reached a range in which the coordinates of the tablet 12 can be detected, and the position detecting circuit 5 continues to supply those coordinates to the data processing device 7.

Figure 12:
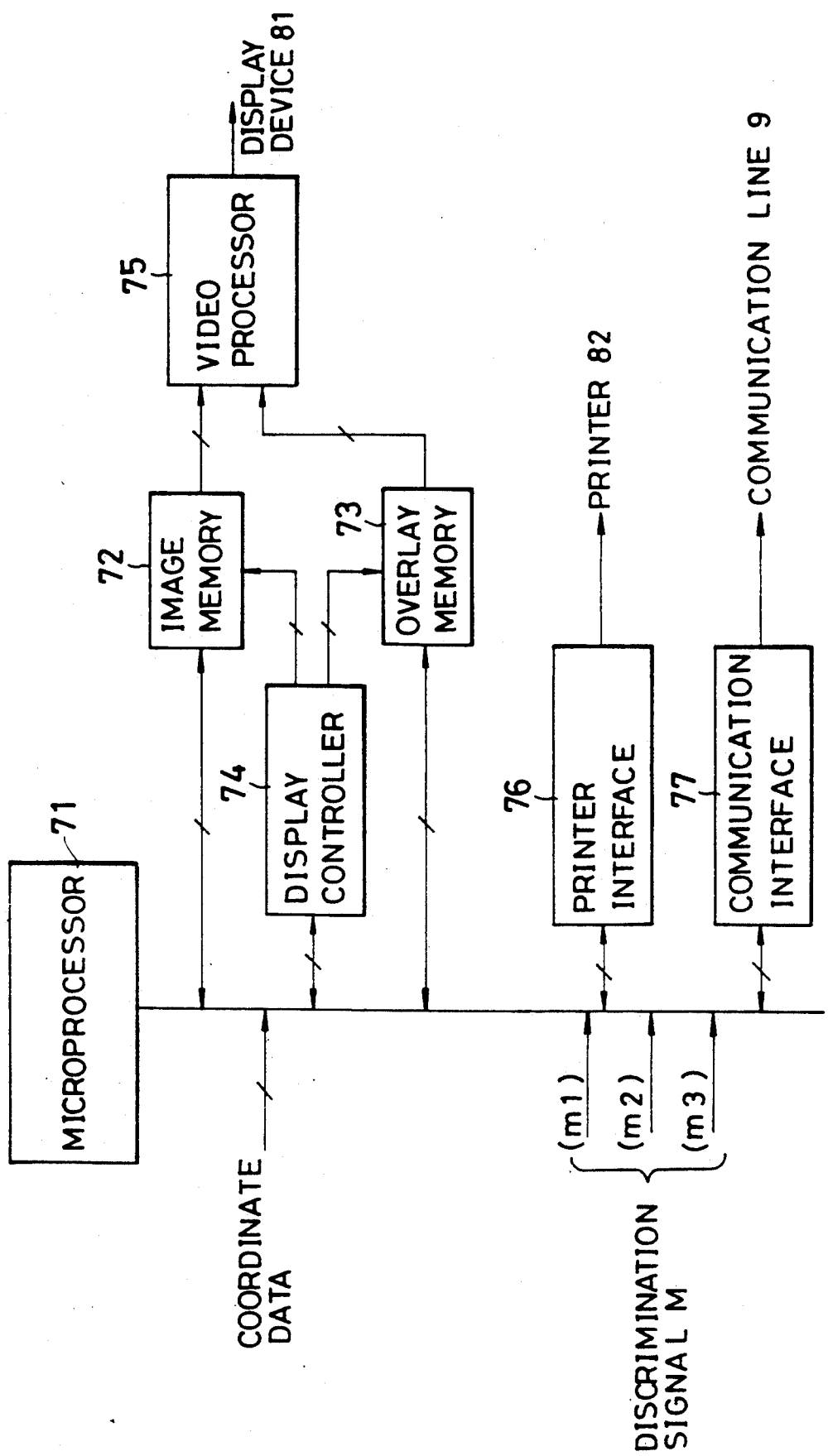
FIG. 12 is a schematic diagram illustrating details of a data processing device.

FIG. 12 illustrates a configuration of the data processing device 7. The data processing device 7 comprises the following major components: a microprocessor 71, an image memory 72, an overlay memory 73, a display controller 74, a video processor 75, a printer interface 76, and a communication interface 77.

Figure 13:
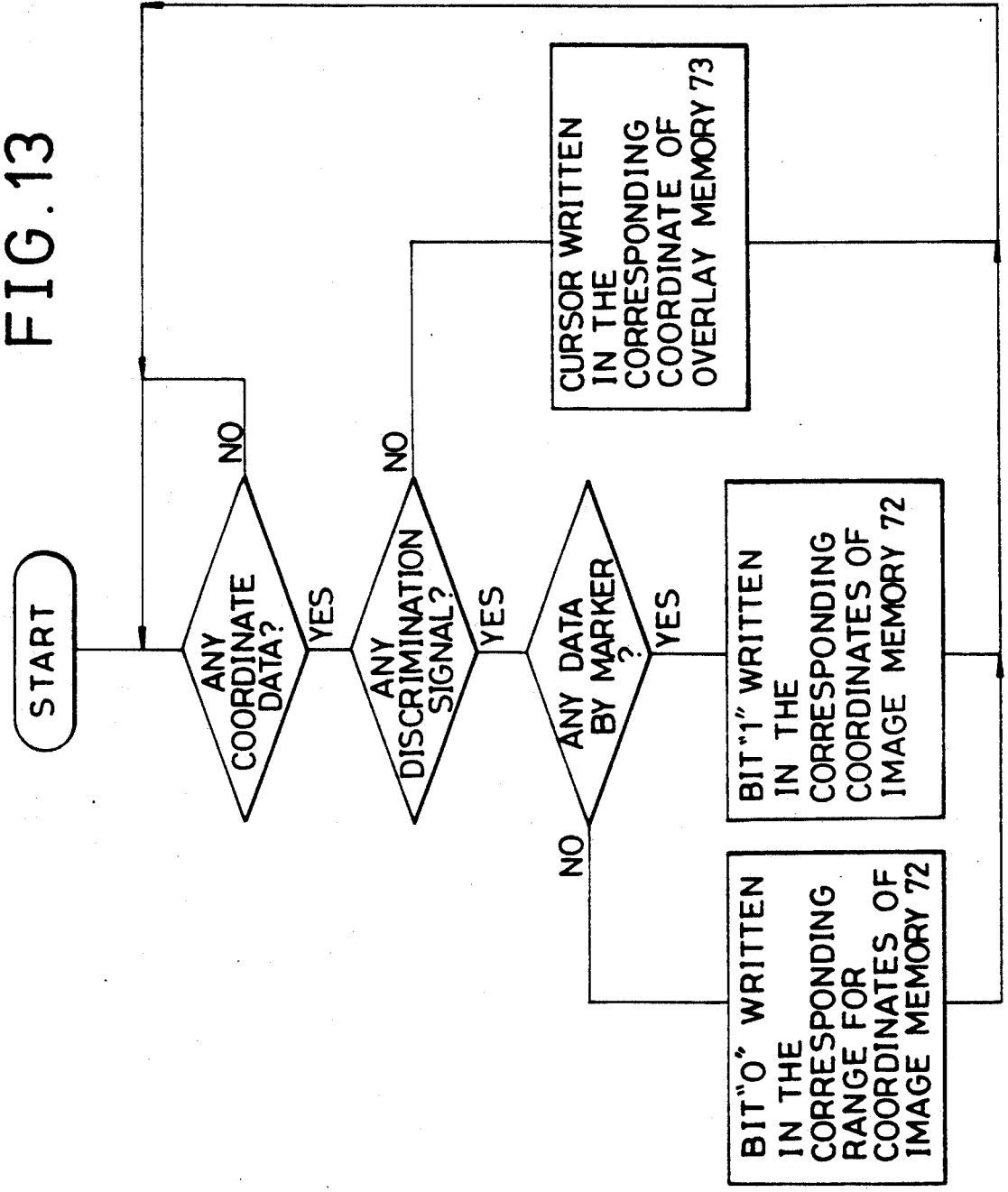
FIG. 13 is a flowchart illustrating processing by a microprocessor of the data processing device.

In addition, FIG. 13 shows a schematic flowchart of the microprocessor 71, and the operation of the data processing device 7 will be described below.

First, upon receiving the coordinate data from the position detecting circuit 5, the microprocessor 71 discriminates whether or not the discrimination signal M is present (actually, whether the pen-down signal m1 is of high level or low level).

If the discrimination signal M is present, discrimination is further conducted on the basis of the discrimination information m2, m3 thereof as to whether the data has been given by the marker 2 or by the eraser 3. If the data is that given by the marker 2, bit "1" is written in the corresponding coordinates of the image memory 72. Strictly speaking, the image memory 72 is constituted by frame memories corresponding to the colors (black, red, green) of the respective inks of the marker 2, and bit "1" is written in the frame memory corresponding to the color discriminated by the discrimination information m2, m3 (for instance, the color in the above-described case is black since m2, m3="L, L"). Meanwhile, if the data is that given by the eraser 3, that data is recognized as set coordinates in a predetermined range to be erased by the eraser 3, and bit "0" is written in a range predetermined by the coordinates in the image memory 72, thereby erasing the video date.

On the other hand, if the discrimination signal M is not present, a pattern of a cursor, such as an arrow ↑, is generated by a character generator (not shown), and this is written in the corresponding coordinates of the overlay memory 73. Incidentally, the content of the image memory 72, once written, is arranged to be held unless other data is written therein. However, the content of the overlay memory 73 is arranged to be lost unless data is rewritten within a predetermined time (normally several milliseconds). In addition, if the coordinate data supplied from the position detecting circuit 5 undergoes change, the position of the cursor also changes correspondingly.

The contents of the image memory 72 and the overlay memory 73 are read simultaneously, are then sent to the video processor 75 where they are converted into a video signal, which is further supplied to the display device 81, such as a color CRT, so as to be displayed.

The writing and reading of data with respect to the memories 72, 73 are controlled by the display controller 74.

Thus, when the marker 2 or the eraser 3 is used on the writing surface 15, the content of the image memory 72 is rewritten in correspondence with the image at that time. Alternately, if the designating rod 4 is used or the marker 2 or the eraser 3 is used without being brought into contact with the writing surface 15, the cursor is written in the overlay memory 73 in correspondence with the position on the image at that time. Accordingly, the image formed by the writing instrument can be displayed in dots on the screen of the display device 81, and, at the same time, a desired portion of the image can be designated by the cursor.

In addition, an arrangement can be provided such that it is possible to display an expanded image of a particular area of the writing surface 15 on the screen of the display device 81 and to move the image of the particular area in correspondence with the movement of the designating rod 4 on the screen.

Furthermore, at that time, if the electronic blackboard system is connected with another similar system via the communication interface 77 and the communication line 9 and transmission and reception of data is being carried out, the above-described coordinate data and the discrimination signal M are transmitted as they are, with the result that the same picture and cursor as those described above can be displayed on the display device of the other electronic blackboard system.

Incidentally, when a hard copy of the image is to be obtained, since only the content of the image memory 72 is sent to the printer 82 via the printer interface 76, so that the cursor is not recorded in the hard copy.

In the above-described embodiment, the transmission coil 13 and the reception coil 14 are disposed such as to be spaced apart from each other to such an extent that they do not affect each other so much. However, their positions may be reversed, and the coils 13 and 14 may be arranged perpendicularly to the board surface of the blackboard body 1. In addition, to effect more stable transmission and reception of radiowaves, the ground of the transmission/reception changeover circuits 603, 604 may be connected to the writing surface 15 made of a metal.

Moreover, although, in the above-described embodiment, radiowaves are used as a wireless signal, it is also possible to use known ultrsonic waves, infrared rays, or the like. In such a case, the writing instrument may be provided with a transmitter, and the blackboard body may be provided with a receiver.

Figure 14:
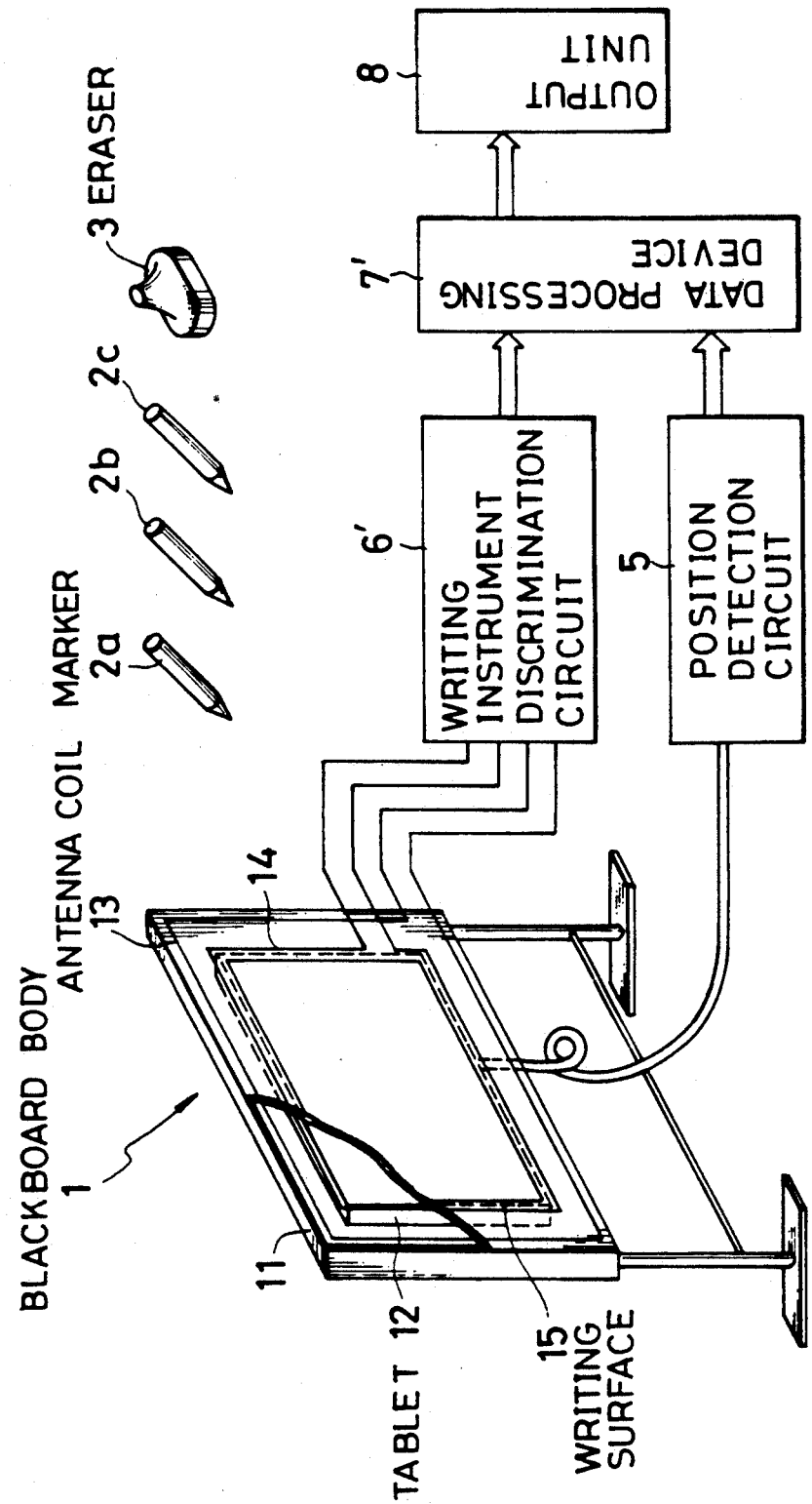
FIG. 14 is a diagram illustrating a second embodiment of the present invention.

FIGS. 14 to 17 illustrate a second embodiment of the present invention. As shown in FIG. 14, this embodiment is a case where three markers 2a to 2c are used instead of the designating rod 4. In these drawings the arrangement of this embodiment is similar to that of the foregoing embodiment except those described below. The markers 2a to 2c basically have the same constructions that shown in FIG. 5, but the marker 2a is black in terms of the color of the ink of the pen body 22, and the tuning frequency f1 of the tuning circuit 25 is set to, for instance, 280 kHz. On the other hand, the markers 2b and 2c are, for instance, red and green in terms of the color of the ink of the pen body 22, and the tuning frequencies of the tuning circuits 25 are respectively set to predetermined frequencies f2 and f3, e.g. 290 kHz and 300 kHz.

Figure 15:
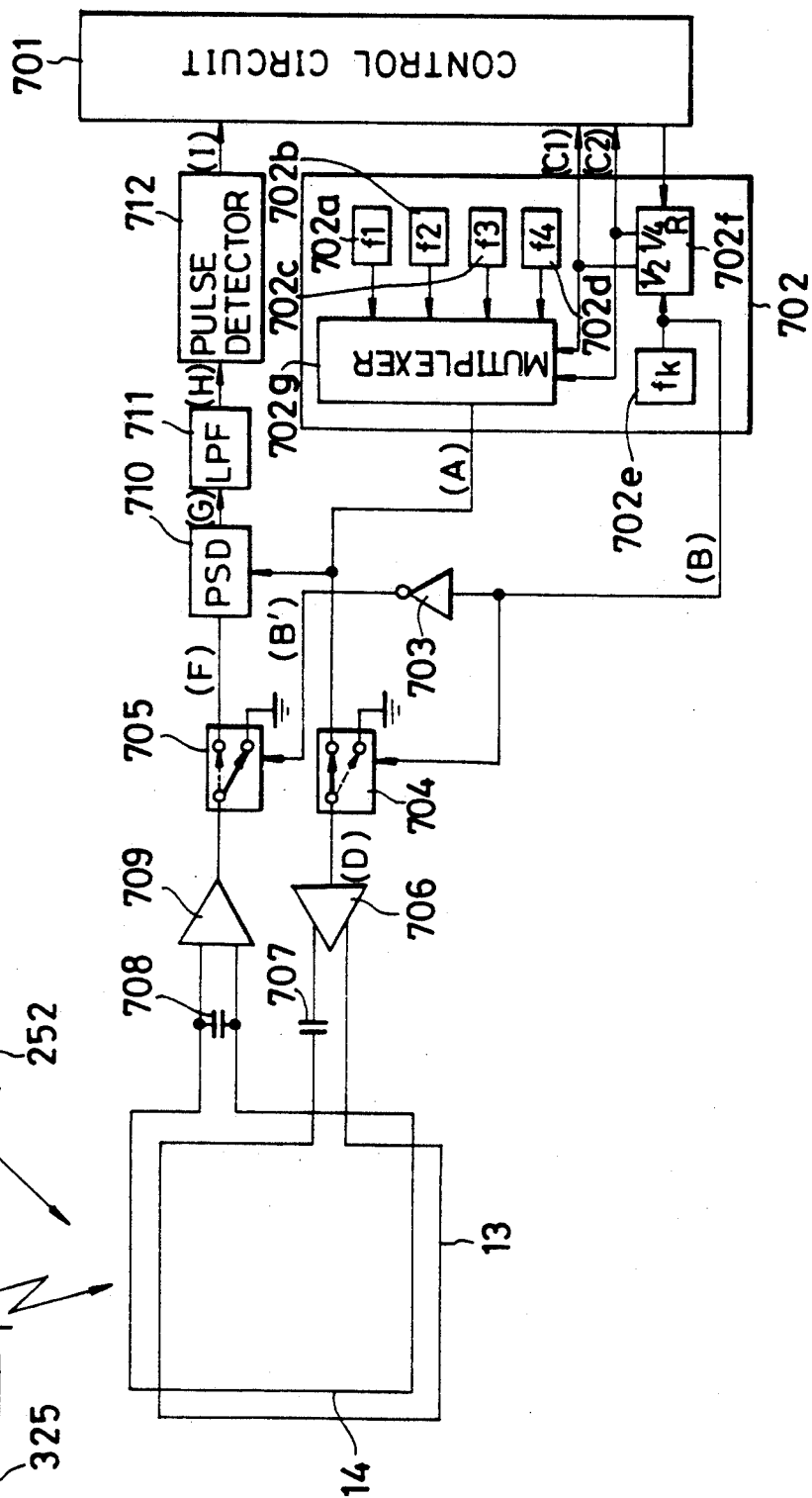
FIG. 15 is a detailed schematic diagram of tuning circuits of the marker and the eraser and the writing instrument discriminating circuit.

FIG. 15 shows detailed configurations of the tuning circuits of the markers 2a to 2c and the eraser 3 as well as a writing instrument discrimination circuit 6'. The writing instrument discrimination circuit 6' comprises the following major components: a control circuit 701; a timing circuit 702; an inverter 703; analog switches 704, 705; a drive circuit 706; capacitors 707, 708; an amplifier 709; a phase detector (PSD) 710; a low-pass filter (LPF) 711; and a pulse detector 712.

Figure 16:
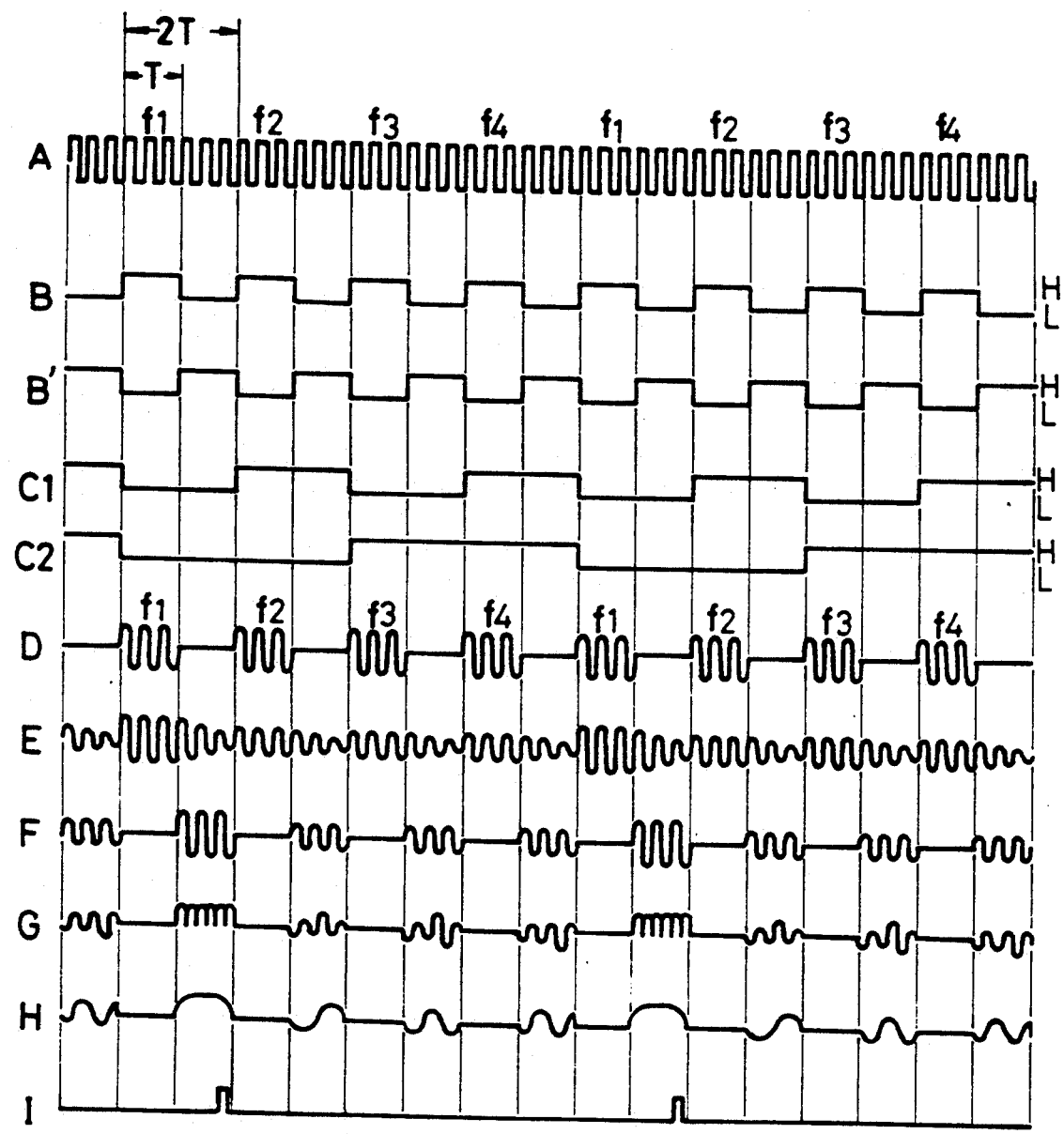
FIG. 16 is a signal waveform diagram of various parts shown in FIG. 15.

FIG. 16 is a signal waveform diagram in the respective parts shown in FIG. 15. A detailed description will now be given the arrangements of the respective parts shown in FIG. 15 and their operation.

The control circuit 701 is constituted by a known microprocessor or the like and supplies a timing signal for starting the operation to the timing circuit 702 in accordance with the flowchart shown in FIG. 17. The control circuit 701 receives an output signal from the pluse detector 712, discriminates the type of the writing instrument being used, i.e., whether the markers 2a to 2c or the eraser 3 is being used, in accordance with the frequency information transmitted from the timing circuit 702, and supplies the same to a data processing device 7'.

The timing circuit 702 comprises rectangular wave signal generators 702a, 702b, 702c, 702d, 702e for generating rectangular wave signals of frequencies f1, f2, f3, f4, fk, respectively, as well as a dividing counter 702f and a multiplexer 702g. The rectangular wave signals of the frequencies f1 to f4 are respectively input to the input terminals of the multiplexer 702g, while the rectangular wave signal of the frequency fk is divided into two equal parts and four equal parts by the dividing counter 702f, signals thereof being input to the control terminals of the multiplexer 702g. The multiplexer 702g outputs a signal A which consecutively repeats rectangular wave signals of the frequencies f1, f2, f3, f4 at intervals of a predetermined time duration 2T (=1/fk). In additio the rectangular wave signal of the predetermined frequency fk is output as a transmission/reception changeover signal B, while the signals obtained by dividing the rectangular wave signal of the frequency fk into two equal parts and four equal parts are output as 2-bit transmitted frequency information C1 and C2 which indicate which of f1 to f4 is being used as the frequency of the signal A at that time.

The signal A is supplied to the position detector 710 and is converted into a sinusoidal signal by means of a low-pass filter (not shown), which is then supplied to one input terminal of the analog switch 704. Meanwhile, the transmission/reception changeover signal B is supplied to the control terminal of the analog switch 704 and also to the inverter 703. The transmitted frequency information C1, C2 is supplied to the control circuit 701.

The other input terminal of the analog switch 704 is grounded. The analog switch 704 selects the one input terminal when the transmission/reception changeover signal B is of high (H) level and selects the other input terminal when the signal is of low (L) level. Therefore, the analog switch 704 outputs a signal D which sinusoidal signals of the frequencies f1-f4 are consecutively supplied for only the time duration T or not supplied at intervals of time 2T.

The signal D is supplied to the drive circuit 706 where the signal is converted into an equilibrium signal, which is further sent to the antenna coil 13. However, since the capacitor 707 and the antenna coil 13 constitutes a serial resonance circuit having resonance frequencies centering on the frequencies f1-f4, radiowaves ae consecutively transmitted from the antenna coil 13 for only the time duration T at intervals of time 2T.

At that juncture, if a marker such as 2a is used on the writing surface 15 of the blackboard body 1, i.e., if the marker 2 is held in such a manner that an angle formed between the pen shaft 21 and the writing surface is kept within 90°-45° or thereabouts with the tip of the pen body 22 contacting the writing surface 15 and with the switch 251 kept in an operative state, the component of the frequency f1 among the aforementioned radiowaves excites the coil 252 of the marker 2a, which in turn causes an induced voltage synchronized with the component of the frequency f1 of the signal C to be produced in the tuning circuit 25 thereof (actually, however, the coil 252 is excited by the components of the other frequencies f2-f4 among the radiowaves, but since the frequencies are slightly different, their amplitude is small).

Subsequently, when the signal D is not generated, i.e., during the period of reception, the antenna coil 13 is grounded, so that the radiowaves disappear immediately. However, the aforementioned induced voltage E gradually attenuates in accordance with the loss in the tuning circuit 25.

On the other hand, the current flowing through the tuning circuit 25 on the basis of the induced voltage E causes the coil 252 to transmit radiowaves of the frequency f1. These radiowaves excite the antenna coil 14, causes a parallel resonance circuit comprising the antenna coil 14 and the capacitor 708 connected thereto to produce an induced voltage of the frequency f1 (actually, however, the antenna coil 14 is excited by radiowaves transmitted by the antenna coil 13, but since the antenna coil 14 is grounded during this period, as will be described later, no induced voltage is generated). The induced voltage is transmitted to and amplified by the amplifier 709, and is further transmitted to the analog switch 705.

The analog switch 705 is designed to change over the output of the amplifier 709 to the phase detector 710 or ground on the basis of an inversion signal B' of the transmission/reception changeover signal B input to the control terminal thereof via the inverter 703. Since the output of the amplifier 709 is connected to the phase detector 710 when the inversion signal B' is of the high level and to ground when it is of low level. Accordingly, a signal F which is provided with an induced voltage of the frequency f1 based on the frequency component f1 in the signal d as well as induced voltages of the frequency f1 based on the frequencies components f2 to f4 in the signal D is obtained as the output of the analog switch 705.

The signal F is supplied to the phase detector 710, but the signal A has already been input to the phase detector 710 as a detection signal. Accordingly, among the induced voltages contained in the signal F, the frequencies and phases of those portions corresponding to the component of the frequency f1 in the signal A agree with each other, but the frequencies and phases of those portions correspondings to the components of the other frequencies f2 to f4 do not agree with each other.

Therefore, among the induced voltages contained in the signal F, a signal F is output from the phase detector 710, and the signal F has a voltage component folded back to the positive side with respect to the portion corresponding to the component of the frequency f1 in the signal A and has a voltage components on the positive and negative sides with respect to portions corresponding to the components of the other frequencies f2 to f4.

The signal G is supplied to a low-pass filter 711 having a sufficiently low cut-off frequency. This low-pass filter 711 converts the signal G into a signal H. The signal H has a DC component provided with a predetermined time span and a predetermined voltage with respect to the portion corresponding to the component of the frequency f1 in the signal A, and also has an AC waveform corresponding to a frequency representing a difference between the frequencies f2-f4 and the frequency f1 with respect to the portion corresponding to the component of the other frequencies f2-f4. Subsequently, this signal H is supplied to the pulse detector 712.

The pulse detector 712 is constituted by a SChmitt trigger circuit, a pulse-width detection circuit or the like and is arranged such that, when it detects a pulse of a predetermined width such as T/2 or above in an input signal thereof, the pulse detector 712 supplies a pulse signal to the control circuit 701. In this case, a DC component of the signal H corresponding to the component of the frequency f1 in the signal A is detected to generate a pulse signal, and a signal I thereof is supplied to the control circuit 701.

Upon receiving the signal I, on the basis of the transmitted frequency information C1, C2 at that point of time, or "L, L" in this case, the control circuit 701 discriminates the writing instrument being used, i.e., the marker 2, and supplies this information to the date processing device 7'.

Meanwhile, regardless of the presence or absence of the discrimination information, the position detection circuit. 5 detects a position, starting from the time when a magnetic bias caused by the magnet 23, 24a, or 24b of the marker 2a reaches a detectable range of the coordinates of the tablet 12, and continues to send the coordinates to the data processing device 7'.

The data processing device 7' normally stores the coordinates output from the position detection circuit 5 in a buffer or the like as temporary values, but recognizes the coordinates when the discrimination information of the marker 2a is received, as the image data provided by the marker 2a, i.e., as the black image data, and then stores the same in an image memory or the like (not shown).

In addition, when the marker 2b or 2c is set in a usable state on the writing surface 15 of the blackboard body 1, the writing instrument discrimination circuit 6' discriminates the same in a manner similar to that described above, and sends the discrimination information thereof, i.e., the discrimination information on the marker 2b or 2c to the data processing device 7'. The data processing device 7', in a manner similar to that described above, recognizes the coordinates obtained at that time as the image data provided by the marker 2b or 2c, i.e., as the red or green image data, and stores the same in an image memory.

If the eraser 3 is used on the writing surface 15 of the blackboard body 1, i.e., if a part or all of the erasing member 37 is pressed against the writing surface 15 and either one or both of the switches 321, 322 of the tuning circuits thereof are set in an operative state, discriminates the same in a manner similar to that described above, and supplies the discrimination information, i.e., the discrimination information on the eraser 3, to the data processing device 7'. The data processing device 7' recognizes the coordinates obtained at that time as the set coordinates of the predetermined region to be erased by the eraser 3, and erases the image data in the predetermined range determined by the coordinates stored in the image memory.

Thus, the image data obtained in the image memory of the data processing device 7' is displayed on the color display (not shown) or output by the the output device 8, such as a color printer, as a hard copy, as necessary. Furthermore, the image data may be transmitted to another data processing device via a public telephone line, a data line or the like in the same way as the foregoing embodiment.

It goes without saying that, if the marker 2a-2c or the eraser 3 is merely brought close to the writing surface 15 of the blackboard apparatus 1 and unless the switch thereof is made operative, no pulse signal is issued from the pulse detector 712, so that the control circuit 701 does not output the discrimination information thereof.

What is claimed is:

1. In combination, a coil, plural objects adapted to be selectively in proximity to the coil, each of the objects including a tuned circuit having a different resonant frequency, means for supplying AC energy at the different resonant frequencies to the coil, the tuned circuit on the particular object in proximity to the coil having substantially the same resonant frequency as the frequency of the AC energy supplied to the coil causing a change in the current flowing in the coil at said same resonant frequency, means for sensing the change in the current flowing in the coil at said same resonant frequency, and means responsive to the current change at said same resonant frequency for indicating the particular object having the tuned circuit with the same resonant frequency as the frequency of the applied AC energy, said indicating means including phase detector means responsive to the changed current flowing in the coil at said same resonant frequency and a reference wave at said same resonant frequency for: (a) deriving indications of the polarities of the phase of quadrature components of the change current relative to the reference wave, and (b) indicating the durations of the polarity indications relative to predetermined values therefor.

2. The combination of claim 1 wherein said phase detector means includes: first and second phase detectors for deriving d.c. signals having polarities indicative of said indications of the polarities, separate pulse width detectors responsive to said first and second polarities for deriving binary levels indicative of the polarities subsisting for in excess of a predetermined duration, and gate means responsive to said pulse width detectors.

3. The combination of claim 2 wherein each of said separate pulse width detectors includes, for each phase detector, first and second comparators for deriving first and second bi-level signals having durations equal to the intervals while the d.c. signals respectively have the first and second polarities, the separate pulse width detectors further including first and second pulse width detectors respectively responsive to the first and second bi-level signals derived by the first and second comparators.

4. The combination of claim 1 wherein the energy at the different frequencies is sequentially supplied to the coil.

5. The combination of claim 4 wherein the change is detected by supplying the coil during a first interval with the AC energy at one of the predetermined frequencies, the means for sensing being activated to be responsive to energy coupled back to the coil from the turned circuit during a second interval while the coil is not supplied with the AC energy at the one predetermined frequency.

6. The combination of claim 5 wherein said phase detector means includes: first and second phase detectors for deriving d.c. signals having polarities indicative of said indications of the polarities, separate pulse width detectors responsive to said first and second polarities for deriving binary levels indicative of the polarities subsisting for in excess of a predetermined duration, and gate means responsive to said pulse width detectors.

7. The combination of claim 6 wherein said separate pulse width detectors includes, for each phase detector, first and second comparators for deriving first and second bi-level signals having durations equal to the intervals while the d.c. signals respectively have the first and second polarities, the separate pulse width detectors further including first and second pulse width detectors respectively responsive to the first and second bi-level signals derived by the first and second comparators.

8. The combination of claim 1 further including means for detecting the position of the identified object, said position detecting means coupling energy between the object and a region including the coil, said region including a two-dimensional array of detectors for interacting with the coupled energy.

9. The combination of claim 1 wherein said objects are cordless and no electric power supply is connected to any of said tuned circuits.

10. The combination of claim 1 further including a position sensing tablet; the coil being associated with the tablet; a two-coordinate direction display superposed with the tablet; one of the objects being a marker for the display another of the objects being an eraser for the display; the tablet, marker and eraser having structures for coupling energy between them; the structure on the marker including one of the tuned circuits having a first resonant frequency; the structure on the eraser including another of the tuned circuits having a second resonant frequency; the turned circuits on the marker and the eraser when placed in proximity to the coil respectively causing changes in the current flowing in the coil at said first and second frequencies; and means responsive to the energy coupled between the tablet, marker and eraser for deriving a signal indicative of the position of markings by the marker on the diaplay as modified by the eraser, said last named means sensing the changes in the current flowing in the coil at said first and second frequencies.

11. The combination of claim 10 wherein the energy at the different frequencies is sequentially supplied to the coil.

12. The combination of claim 11 wherein the change is detected by supplying the coil during a first interval with the AC energy at one of the predetermined frequencies, the means for sensing being activated to be responsive to energy coupled back to the coil from the tuned circuit during a second interval while the coil is not supplied with the AC energy at the one predetermined frequency.

13. The combination of claim 12 further including another two coordinate display responsive to the signal indicative of the position of the modified markings for displaying the modified markings.

14. The combination of claim 13 further including a plurality of said markers, each of said markers being for a different color and including one of the tuned circuits with a different resonant frequency, the means for supplying feeding AC energy at each of the resonant frequencies to the coil, the means for sensing responding to changes in the current flowing in said coil at each of the resonant frequencies, said another display displaying the position and colors of marking made by each of said markers.

15. The combination of claim 10 further including another two coordinate display responsive to the signal indicative of the position of the modified markings for displaying the modified markings.

16. The combination of claim 15 further including a plurality of said markers, each of said markers being for a different color and including one of the tuned circuits with a different resonant frequency, the means for supplying feeding AC energy at each of the resonant frequencies to the coil, the means for sensing responding to changes in the current flowing in said coil at each of the resonant frequencies, said another display displaying the position and colors of marking made by each of said markers.

17. The combination of claim 10 wherein said marker and eraser are cordless and no electric power supply is connected to the tuned circuits thereof.

18. The combination of claim 1 further including a position sensing tablet; the coil being associated with the tablet; a two coordinate direction display superposed with the tablet; the objects including plural markers for the display, each of the marker being for a different color on the display; the tablet and marker having structures for coupling energy between them; the structure on each of the markers including one of the tuned circuits having a different resonant frequency, the tuned circuits on the markers when placed in proximity to the coil causing changes in the currents flowing in the coil at said different frequencies; and means responsive to the energy coupled between the tablet and marker for deriving a signal indicative of the position of the colors of markings by the markers on the display, said last named means sensing the changes in the current flowing in the coil at said different frequencies.

19. The combination of claim 18 wherein the energy at the different frequencies is sequentially supplied to the coil.

20. The combination of claim 19 wherein the change is detected by supplying the coil during a first interval with the AC energy at one of the predetermined frequencies, the means for sensing being activated to be responsive to energy coupled back to the coil from the tuned circuit during a second interval while the coil is not supplied with the AC energy at the one predetermined frequency.

21. The combination of claim 20 further including another two coordinate color-display responsive to the signal indicative of the position of markings for displaying the position and color of the markings.

22. The combination of claim 18 further including another two coordinate color-display responsive to the signal indicative of the position of markings for displaying the position and color of the markings.

23. The combination of claim 18 wherein said markers are cordless and no electric power supply is connected to the turned circuits thereof.

24. The combination of claim 1 wherein one of the objects includes an eraser for supplying a signal to an electronic display and for removing a marking from a surface of a visual display, the eraser including: a surface for erasing the marking, one of the tuned circuits, and switch means activated in response to the erasing surface being pressed against the display surface for connecting elements of the tuned circuit together so they have a predetermined resonant frequency while the erasing surface is pressed against the display surface.

25. The combination of claim 24 wherein the switch means includes first and second switches positioned and arranged so that the first switch is activated in response to a first edge of the eraser being pushed against the display surface and the second switch is activated in response to a second edge of the eraser, opposite the first edge, being pushed against the display surface.

26. The combination of claim 24 wherein the eraser is cordless and no electric power supply is connected to the tuned circuit.

27. The combination of claim 1 wherein one of the objects includes an eraser for enabling the position and identity thereof to be detected by a positioned sensing tablet that couples energy to the eraser, the eraser also removing a marking from a surface of a visual display superposed with said tablet, the eraser including: a surface for erasing the marking, means interacting with the energy for enabling the tablet to derive a signal indicative of the position and identity of the eraser, said means for enabling including: one of the tuned circuits, and switch means activiated in response to the erasing surface being pressed against the display surface for connecting elements of the tuned circuit together so they have a predetermined resonant frequency while the erasing surface is pressed against the display surface.

28. The eraser of claim 27 wherein the eraser is cordless and no electric power supply is connected to the tuned circuit.

29. Apparatus for determining which one of plural objects is in proximity to a region, each of the objects including a tuned circuit having a different resonant frequency, comprising a coil in the region, means for supplying AC energy at the different resonant frequencies to the coil, the tuned circuit on the particular object in the region having substantially the same resonant frequency as the AC energy supplied to the coil causing a change in the current flowing in the coil at said same resonant frequency, means for sensing the change in the current flowing in the coil at said same resonant frequency and responding to the current change at said same resonant frequency to indicate the particular object having the tuned circuit with the same resonant frequency as the frequency of the applied AC energy, said sensing means including phase detector means responsive to the changed current flowing in the coil at said same resonant frequency and a reference wave at said same resonant frequency for: (a) deriving indications of the polarities of the phase of quadrature components of the changed current relative to the reference wave, and (b) indicating the durations of the polarities relative to predetermined values therefor.

30. The apparatus of claim 29 wherein said phase detector means includes: first and second phase detectors for deriving d. c. signals having polarities indicative of said indications of the polarities, separate pulse width detectors responsive to said first and second polarities for deriving binary levels indicative of the polarities subsisting for in excess of a predetermined duration, and gate means responsive to said pulse width detectors.

31. The apparatus of claim 30 wherein each of said separate pulse width detectors includes, for each phase detector, first and second comparators for deriving first and second bi-level signals having durations equal to the intervals while the d. c. signals respectively have the first and second polarities, the separate pulse width detectors further first and second pulse width detectors respectively responsive to the first and second bi-level signals derived by the first and second comparators.

32. The apparatus of claim 29 wherein the energy at the different frequencies is sequentially supplied to the coil.

33. The apparatus of claim 32 wherein the change is detected by supplying the coil during a first interval with the AC energy at one of the predetermined frequencies, the means for sensing being activated to be responsive to energy coupled back to the coil from the tuned circuit during a second interval while the coil is not supplied with the AC energy at the one predetermined frequency.

34. The apparatus of claim 33 wherein said phase detector means includes: first and second phase detectors for deriving d. c. signals having polarities indicative of said indications of the polarities, separate pulse width detectors responsive to said first and second polarities for deriving binary levels indicative of the polarities subsisting for in excess of a predetemined duration, and gate means responsive to said pulse width detectors.

35. The apparatus of claim 34 wherein each of said separate pulse width detectors includes, for each phase detector, first and second comparators for deriving first and second bi-level signals having durations equal to the intervals while the d. c. signals respectively have the first and second polarities, the separate pulse width detectors further first and second pulse width detectors respectively responsive to the first and second bi-level signals derived by the first and second comparators.

36. The apparatus of claim 33 further including means for detecting the position of the identified object, said position detecting means coupling energy between the object and a region including the coil, said region including a two dimensional array of detectors for interacting with the coupled energy.

37. The apparatus of claim 29 further including means for detecting the position of the identified object, said position detecting means coupling energy between the object and a region including the coil, said region including a two dimensional array of detectors for interacting with the coupled energy.

38. The apparatus of claim 29 further including means for detecting the position of the identified object, said position detecting means coupling energy between the object and a region including the coil, said region including a two dimensional array of detectors for interacting with the coupled energy.

* * * * *